(12) United States Patent  (10) Patent No.: US 8,441,460 B2
Chang  (45) Date of Patent: May 14, 2013

(54) APPARATUS AND METHOD FOR PROVIDING SIDE TOUCH PANEL AS PART OF MAN-MACHINE INTERFACE (MMI)

(75) Inventor: Sheng-Kai Chang, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 768 days.

(21) Appl. No.: 12/624,518

(22) Filed: Nov. 24, 2009

(65) Prior Publication Data

US 2011/0122085 A1  May 26, 2011

(51) Int. Cl.
*G06F 3/045* (2006.01)
(52) U.S. Cl.
USPC ............ 345/174; 345/173; 345/184; 345/172
(58) Field of Classification Search ................. None
See application file for complete search history.

(56) References Cited

U.S. PATENT DOCUMENTS

| 7,002,557 | B2 | 2/2006 | Iizuka et al. | |
|---|---|---|---|---|
| 8,255,798 | B2 * | 8/2012 | Ording | 345/173 |
| 2002/0158838 | A1 | 10/2002 | Smith et al. | |
| 2009/0256809 | A1 | 10/2009 | Minor | |
| 2010/0035656 | A1 * | 2/2010 | Pan | 345/158 |

FOREIGN PATENT DOCUMENTS

| TW | 200539031 | 12/2005 |
|---|---|---|
| WO | WO 2009/127916 | 10/2009 |

OTHER PUBLICATIONS

English language translation of abstract of TW 200539031 (published Dec. 1, 2005).

\* cited by examiner

*Primary Examiner* — Muhammad N Edun
(74) *Attorney, Agent, or Firm* — McClure, Qualey & Rodack, LLP

(57) ABSTRACT

A touch sensitive apparatus for providing side touch panel as part of man-machine interface is provided. A front panel are disposed on the front surface. A first sensor being a resistive or capacitive type sensor is disposed on or under one of plurality of side surfaces for sensing a touch thereon. A first sensor controller coupling the first sensor is for generating one or more signals in response to the touch on the first sensor. An application module provides a plurality of applications each comprising a plurality of function handlers. A system framework provides registration information for each function handler associated with an action type on the first sensor, determines an action type in terms of the signal(s) from the first sensor controller, and drives one function handler to perform a specific function according to the determined action type and the registration information.

27 Claims, 32 Drawing Sheets

APPARATUS AND METHOD FOR PROVIDING SIDE TOUCH PANEL AS PART OF MAN-MACHINE INTERFACE (MMI)

BACKGROUND OF THE INVENTION

1. Field of the Invention

The invention generally relates to man-machine interface (MMI), and more particularly, to apparatus and methods for providing side touch panel as part of MMI.

2. Description of the Related Art

To an increasing extent, touch panels are being used as an alternative way to interact with computers, mobile phones, media player devices, gaming devices, etc. The touch panel may be provided with a graphical user interface (GUI) for a user to interact with using, for example, pointers, styluses, fingers, etc. Generally, the GUI is provided by a display screen integrated with, or placed underneath, the touch panel to dynamically display the interface in accordance with a selected application.

In most practices, a single touch panel integrated with a display screen is employed on the main plane of the device to provide a two-dimensional (2D) operation interface. The disadvantage of the design is that viewing of the display screen may be hindered by objects thereon (e.g. finger, stylus etc.). Also, at times, both hands of a user may be required for operation, making operation inconvenient for users. Although the design usually has scroll wheels or buttons employed on the sides of the device, the scroll wheels or buttons are not efficiently utilized, as they normally have limited functions, such as, volume adjustment, switches for turning on or off power, or taking a photo.

In order to alleviate the above-mentioned disadvantages when using a touch panel, there is a need for an extended touch panel to support easier usage with a more convenient operation interface.

BRIEF SUMMARY OF THE INVENTION

Accordingly, embodiments of the invention provide apparatus and methods for providing three-dimensional-like interaction. In one aspect of the invention, a touch sensitive apparatus for providing side touch panel as part of man-machine interface (MMI) is provided. The touch sensitive apparatus comprises a front panel, a first sensor, a first sensor controller, an application module, and a system framework. The front panel is disposed on a front surface for displaying information. The first sensor is disposed on or under one of plurality of side surfaces for sensing a touch thereon. The first sensor controller coupling the first sensor is for generating one or more signals in response to the touch on the first sensor. The application module provides a plurality of applications each comprising a plurality of function handlers. The system framework provides registration information for each function handler associated with an action type on the first sensor, determines an action type in terms of the signal(s) from the first sensor controller, and drives one function handler to perform a specific function according to the determined action type and the registration information. The first sensor is a resistive or capacitive type sensor.

In another aspect of the invention, a method for providing side touch panel as part of man-machine interface, executed by a general-purposed processor or a micro-control unit (MCU) of an electronic apparatus, is provided. The method comprises: receiving one or more signals from a sensor disposed on or under a side panel of the electronic apparatus in response to a touch thereon; determining an action type in terms of the received signal(s); performing a specific function according to the determined action type to update information displayed on a front panel of the electronic apparatus, wherein the sensor is a resistive or capacitive type sensor.

In another aspect of the invention, a touch sensitive apparatus for providing side touch panel as part of man-machine interface is provided. The touch sensitive apparatus includes a front panel, at least two side sensors, a sensor controller, and a processing unit. The front panel is disposed on a front surface for displaying information. The side sensors are disposed on or under one of plurality of side surfaces in series for sensing touches thereon. The sensor controller, coupling the side sensors, generates signals in response to touches on the side sensors at different times. The processing unit, coupling the sensor controller and the front panel, determines a slide action when the received signals indicate that the touches start with one end of the side sensors and end with the other end of the side sensors, and directs the front panel to update the displayed information in terms of the determined slide action.

In another aspect of the invention, a touch sensitive apparatus for providing side touch panel as part of man-machine interface is provided. The touch sensitive apparatus includes a front panel, a first side sensor, a second side sensor, a sensor controller, and a processing unit. The front panel is disposed on a front surface for displaying information. The first side sensor is disposed on or under a first side surfaces for sensing touches thereon. The second side sensor is disposed on or under a second side surface for sensing touches thereon, where one edge of the first side surface is contacted with one edge of the second side surface to form a corner. The sensor controller, coupling the side sensors, generates signals in response to touches on the first and second side sensors at different times. The processing unit, coupling the sensor controller and the front panel, determines a clockwise or counterclockwise slide action when the received signals indicate that the touches are detected by the first and second side sensors in sequence, and accordingly directs the front panel to update the displayed information.

In another aspect of the invention, a touch sensitive apparatus for providing side touch panel as part of man-machine interface is provided. The touch sensitive apparatus includes a front panel, a first side sensor, a second side sensor, a sensor controller, and a processing unit. The front panel is disposed on a front surface for displaying information. The first side sensor is disposed on or under a first side surfaces for sensing touches thereon. The second side sensor is disposed on or under a second side surface for sensing touches thereon. The sensor controller, coupling the side sensors, generates signals in response to touches on the first and second side sensors. The processing unit, coupling the sensor controller and the front panel, directs the front panel to update the displayed information using a first control when the received signals indicate that the touches are detected by the first side sensor, and directs the front panel to update the displayed information using a second control when the received signals indicate that the touches are detected by the second side sensor.

In another aspect of the invention, a touch sensitive apparatus for providing side touch panel as part of man-machine interface is provided. The touch sensitive apparatus includes a front panel, a front panel, a sensor controller, and a processing unit. The front panel is disposed on a front surface for displaying information, and comprises a plurality of front sensors for sensing touches thereon. The side sensor is disposed on or under a side surface for sensing touches thereon. The sensor controller, coupling the side sensor, generates signals in response to touches on the side sensor. The processing unit, coupling the sensor controller and the front panel, changes a control configuration for responding to a touch on the front sensors when the received signals indicate that the touch is detected by the side sensor.

Other aspects and features of the invention will become apparent to those ordinarily skilled in the art upon review of the following descriptions of specific embodiments of the apparatuses and methods for providing three-dimensional-like interaction.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
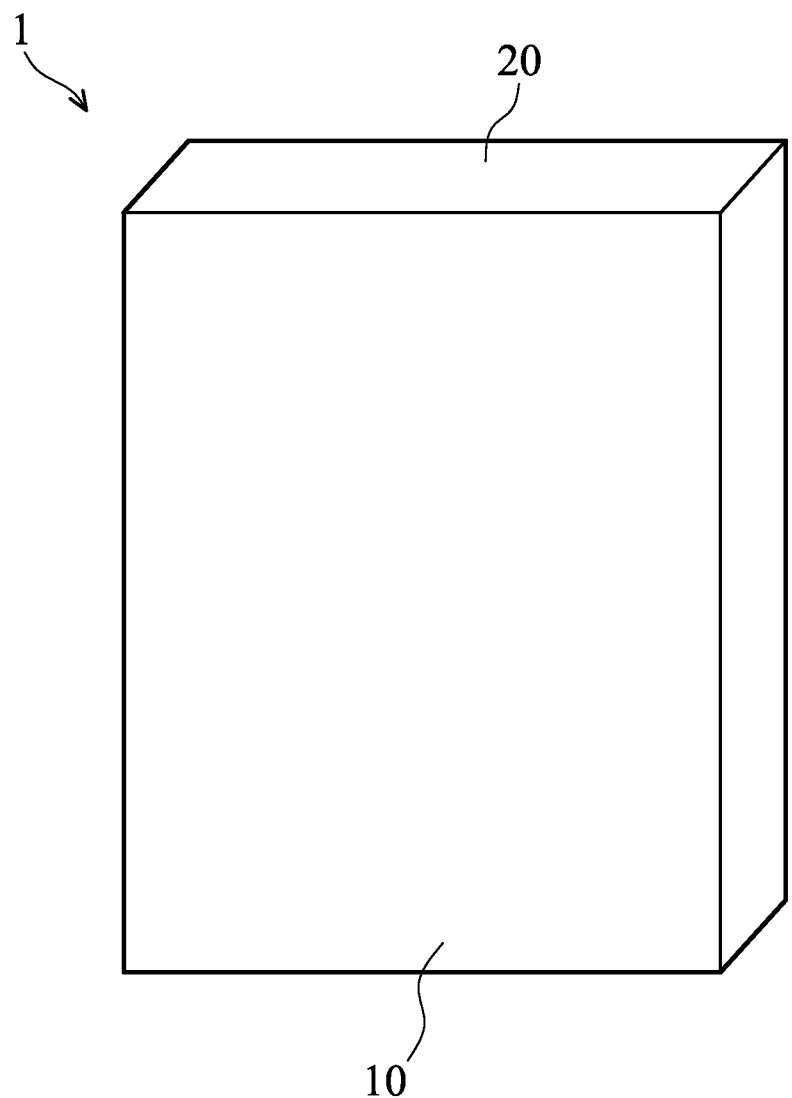
FIG. 1 is a simplified block diagram illustrating the elevated view of a device with a sided touch panel in accordance with an embodiment of the invention.

According to embodiments of the invention, additional touch panel/sensors is/are placed on the sides of the device so that users may manipulate the sides of the device with one hand. FIG. 1 is a simplified block diagram illustrating the elevated view of a device with a sided touch panel in accordance with an embodiment of the invention. The exterior structure of the device 1 may be a rectangular cuboid with 6 faces. The front panel 10 is disposed on the front face, and the side panel 20 is disposed on the upper face. The front face refers to the face with the largest surface area, which is integrated with a display screen and serves as the main interface to the user. The front panel 10 may be referred to as a 2D touch sensitive panel providing 2D touch location identification. Because the side panel 20 is typically narrow, the side panel 20 may be referred to as a 1D touch sensitive panel providing 1D touch location identification. The 2D touch location may be indicated as a two directional coordinate (e.g., "X" and "Y") and the 1D touch location may be indicated as a one directional coordinate (e.g., "Z"). It is to be understood that the side panel 20 is not limited to be disposed on or under a flat surface and may be formed on or under a curved surface. The device 1 may bring together the 2D and 1D touch locations and provide 3D-like interaction for users. With the design, one handed manipulation may be available to users. For example, a user may hold the device 1 with one hand and operate the front panel 10 with a thumb, and operate on the side panel 20 with an index finger. In another embodiment, more side panels may be employed. For example, a second and a third side panels (not shown) may be disposed on the right and left faces of the device 1, and the user may operate the second or third side panel with a thumb, index finger, or middle finger. Other embodiments of the exterior structure will readily suggest themselves to those of ordinary skill in the art.

Figure 2:
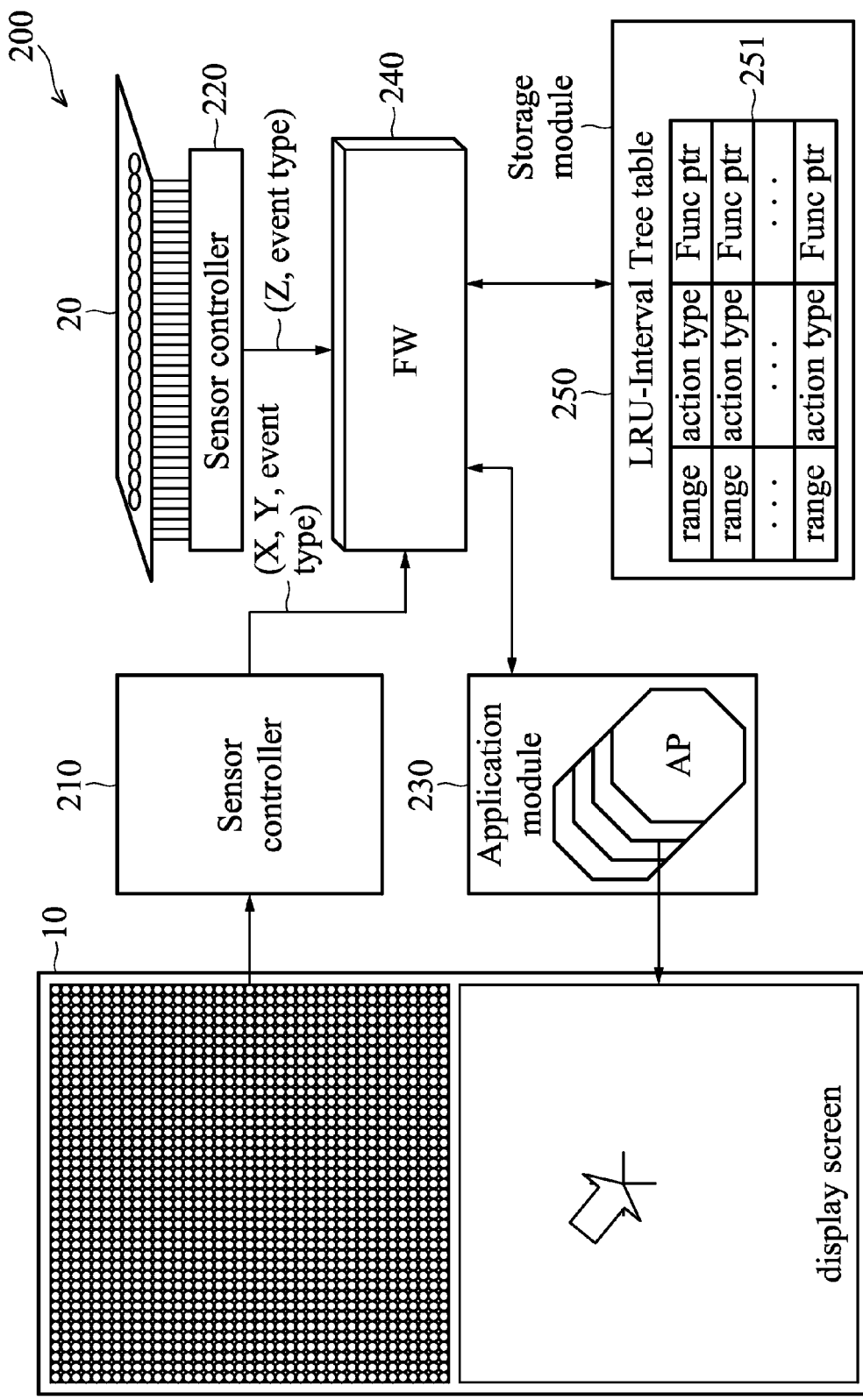
FIG. 2 is a block diagram illustrating the system architecture of the device 1 of FIG. 1.

FIG. 2 is a block diagram illustrating the system architecture of the device 1 of FIG. 1. In the system 200, the application module 230 is capable of registering to the system framework 240 function handlers of the functions supported by each application. In addition, the application module 230 records a location range of the side panel 20 with an action type for activating each registered function of a particular application. A location range refers to one or more sensors of an area on or under the side panel 20. For example, the application module 230 may register function handlers, taking media player as an example, for playing of a particular multimedia file, such as an ".AAC", ".WAV", ".MP3", ".MP4" file, or others, pausing a multimedia file being played, and fast forward and backward of a played multimedia file, each associated with a particular location range and an action type, such as "single-touch", "double-touch", "upward slide", "downward slide", "leftward slide", "rightward slide", "clockwise slide" or "counterclockwise slide", or others. Consequently, when detecting a specified action type in the designated location range, a relevant function handler performs a particular function as mentioned above. The "touch" may mean an object is contacted on a panel and may be interchangeably referred to as "click", "tap", "press", or others. Alternatively, the "touch" may mean an object approximates to sensed by a specific sensor placed on or under the panel, and it cannot be limited thereto. The system framework 240 may maintain the registered information in an LRU (Least Recently Used) Interval Tree table 251 stored in a storage module 250. In the embodiment, the LRU-Interval Tree structure is used to maintain the registered information so as to shorten the look-up time, while in other embodiments, other data structures may be employed for different concerns. For example, a T-tree structure may be employed so as to minimize the space needed for storage. When the sensors disposed in the front panel 10 detects a touch of an object, the sensor controller 210 determines a location and an event type of the touch event, and outputs the location (X, Y) and the event type (type) of the touch event to the system framework 240. The output event types may include "keyup", "keydown", "drag", "drop", "touch", "double-touch" and so on. Similarly, when the sensors disposed in the side panel 20 detects a touch of an object, the sensor controller 220 determines a location and an event type of the touch event, and outputs the location (Z) and the action type (type) of the touch event to the system framework 240. The output event types may include "single-touch", "double-touch", "long-touch", and "slide". It is to be understood that the sensor controller 220 outputting only location information is also feasible. Upon receiving the sensed touch information, the system framework 240 determines a particular action type based on the locations and/or the event types for a time period, searches the LRU Interval Tree table 251 for the matched function handler based on the sensed location and the action type, and drives the matched function handler of the application module 230 to perform specific functions. Accordingly, the application module 230 performs the corresponding function to dynamically adjust the GUI on the display screen of the front panel 10, and/or operates one or more peripheral devices, such as a microphone, a speaker, a camera module, a mass storage device, or any combinations thereof. The system framework 240 and the application module 230 each contains a series of program codes and can be executed by a processing unit, such as a general-purposed processor or a micro-control unit (MCU), or others, embedded in the system 200. For the purpose of illustration, the sensor area and the display screen of the front panel 10 are shown to be separated in FIG. 2. However, in a real environment, the sensor area and the display screen may be overlapped or integrated to be shown as in a single plane to the user. In some embodiments, the front panel 10 may not contain sensors for detecting a location and an event type of any touch on the front panel 10, and the sensor controller 210 is absent for saving hardware design cost and complexity, and battery power consumption as well. Accordingly, the LRU Interval Tree table 25 may store the registered activation information of function handlers supported by the only side panel 20.

The sensors disposed on or under the front panel 10 and side panel 20 may consist of a specific number of micro-sensors or miniature touch units thereon. The micro-sensors or miniature touch units may be disposed uniformly in the panel or disposed as a plurality of parallel lines across the panel. The sensor may be resistive, capacitive, infrared, acoustic type, or any other suitable form of sensor capable of detecting the location of a touch on the panels. Taking capacitive sensors for example, a plurality of electrodes may be employed in rows and columns to form a capacitive matrix, or in rows or columns to form capacitive lines in order to provide the touch location by detecting the change of transcapacitance or the attenuation of the coupling between the electrodes caused by a touch of a conductive object. Alternatively, resistive sensors may be formed by two metallic layers. When an object, such as a finger, presses down on a point on the panel, the two metallic layers become connected at that point, and then, the panel behaves as a pair of voltage dividers with connected outputs. It causes a change in the electrical current which is registered as a touch event and sent to a controller for processing.

Figure 3A:
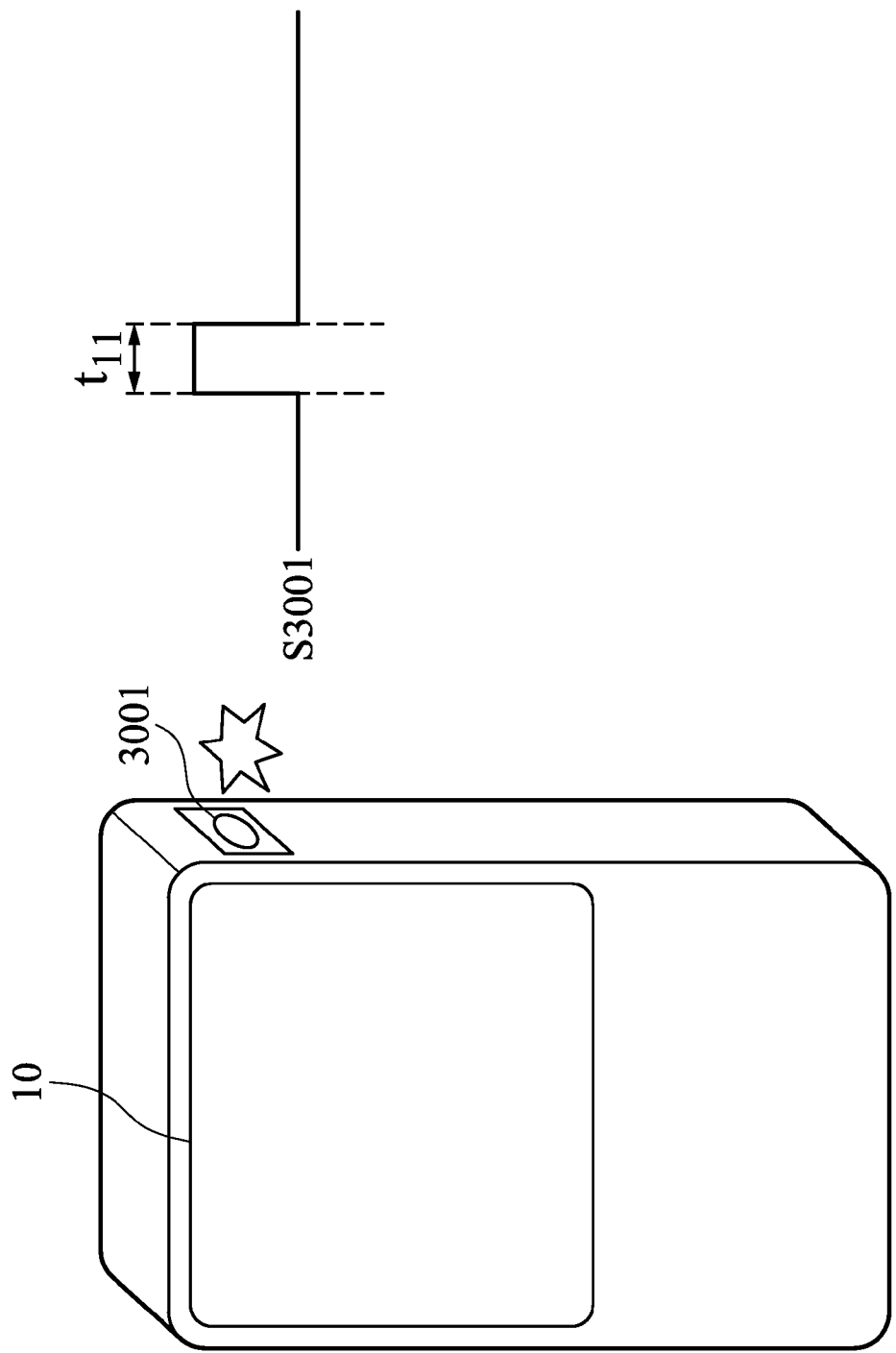
FIG. 3A shows a schematic diagram of a single touch on a side panel according to an embodiment of the invention.
Figure 3B:
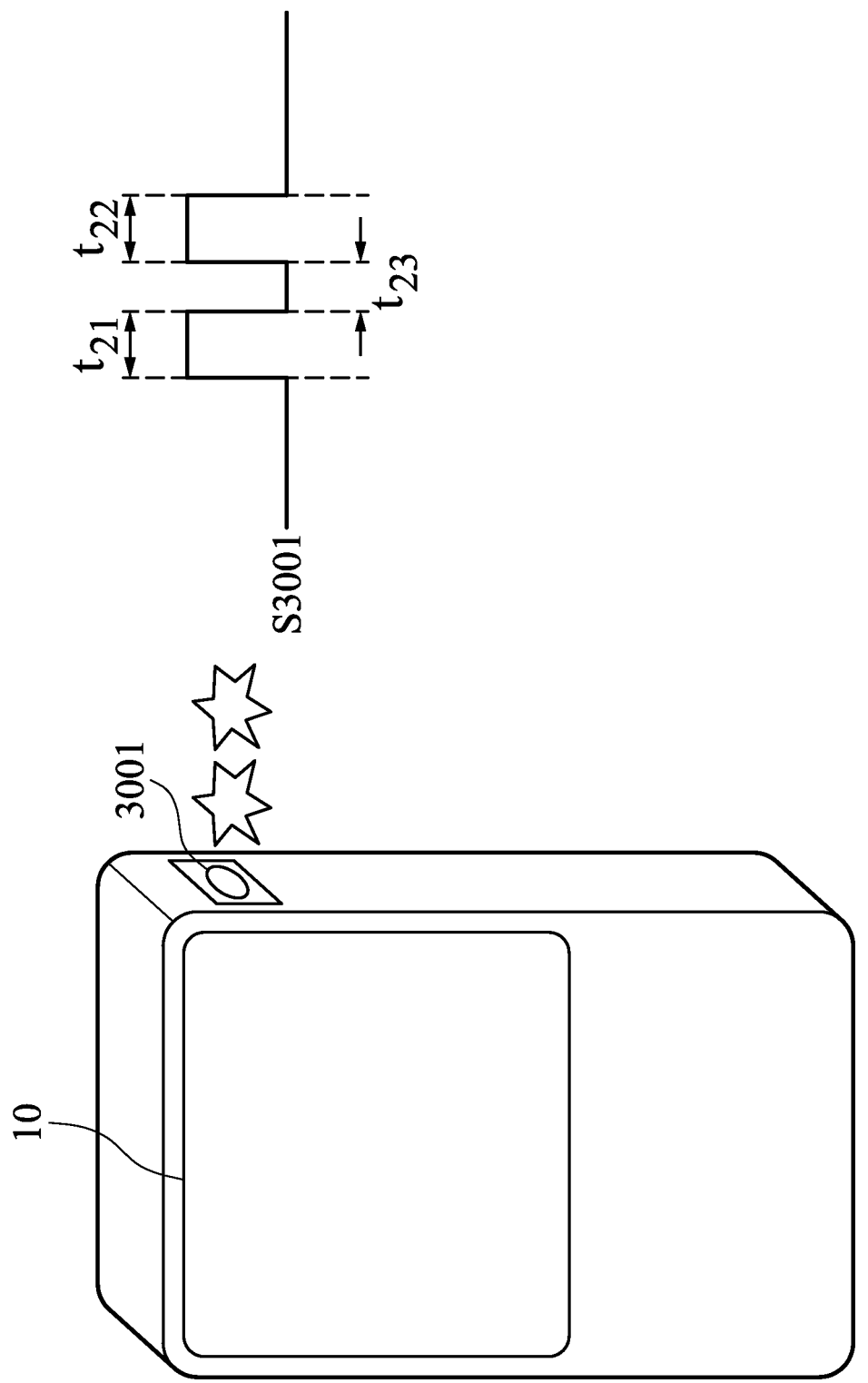
FIG. 3B shows a schematic diagram of a double-touch on a side panel according to an embodiment of the invention.
Figure 3C:
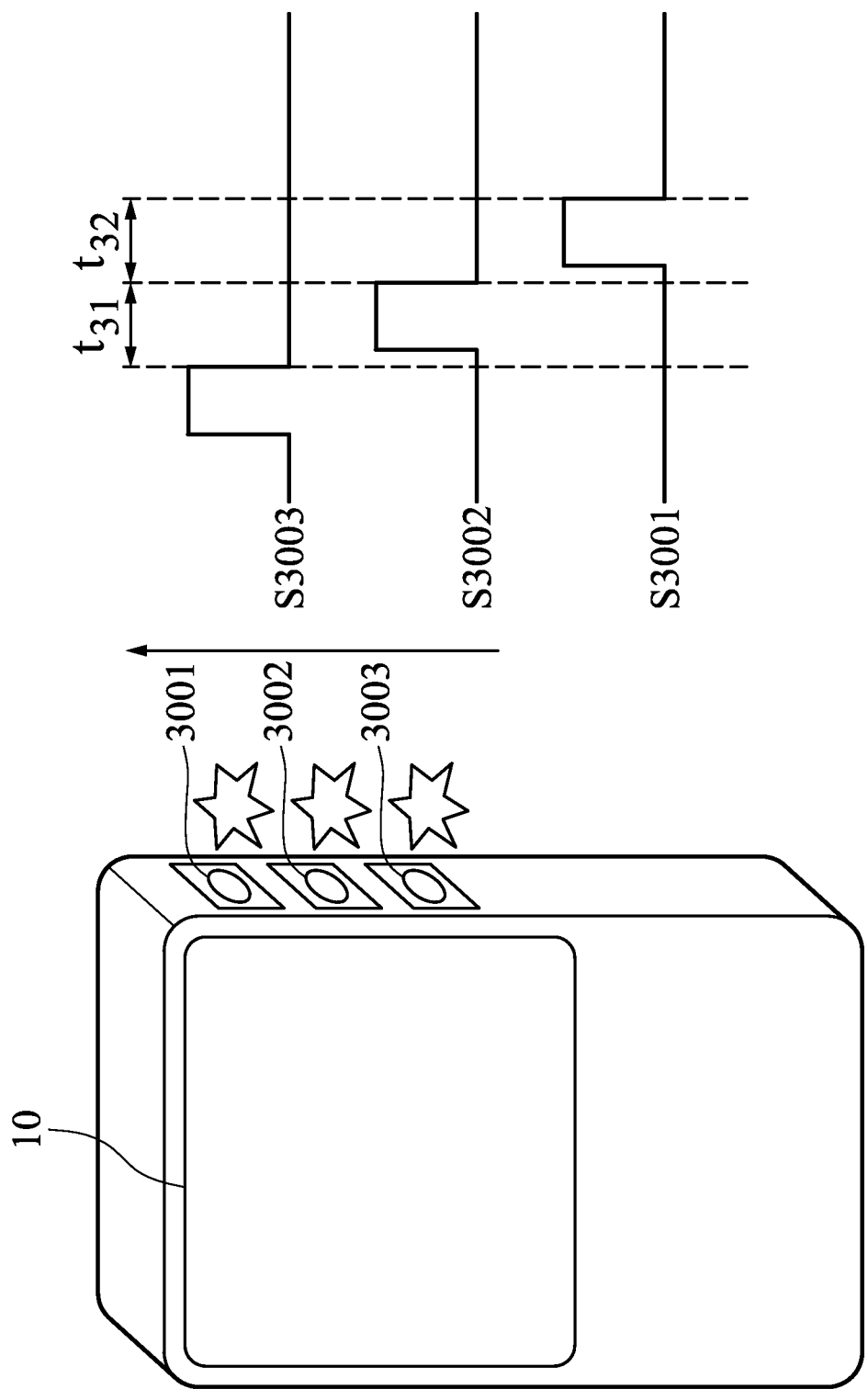
FIG. 3C shows a schematic diagram of an upward slide on a side panel according to an embodiment of the invention.
Figure 3D:
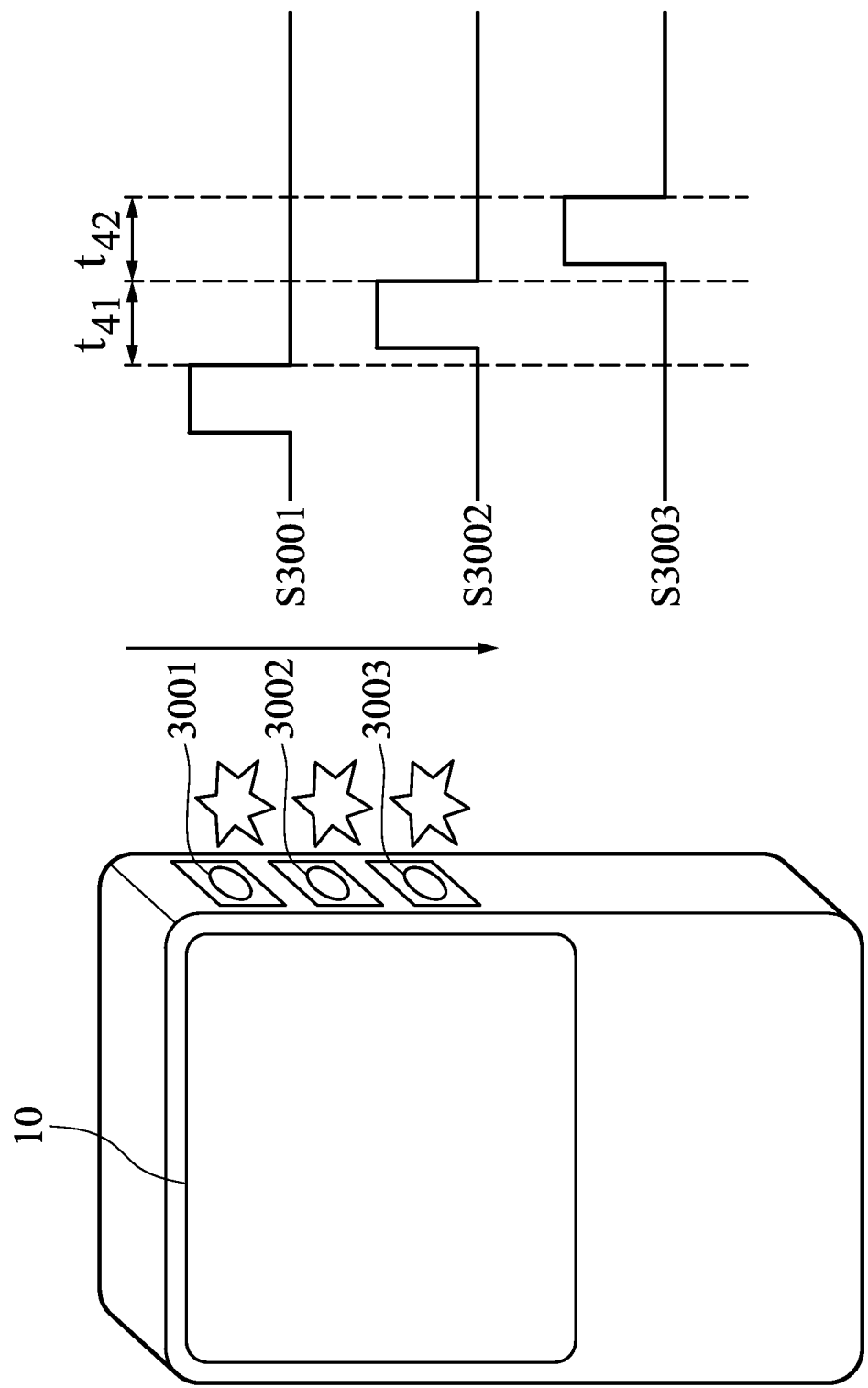
FIG. 3D shows a schematic diagram of a downward slide on a side panel according to an embodiment of the invention.
Figure 3E:
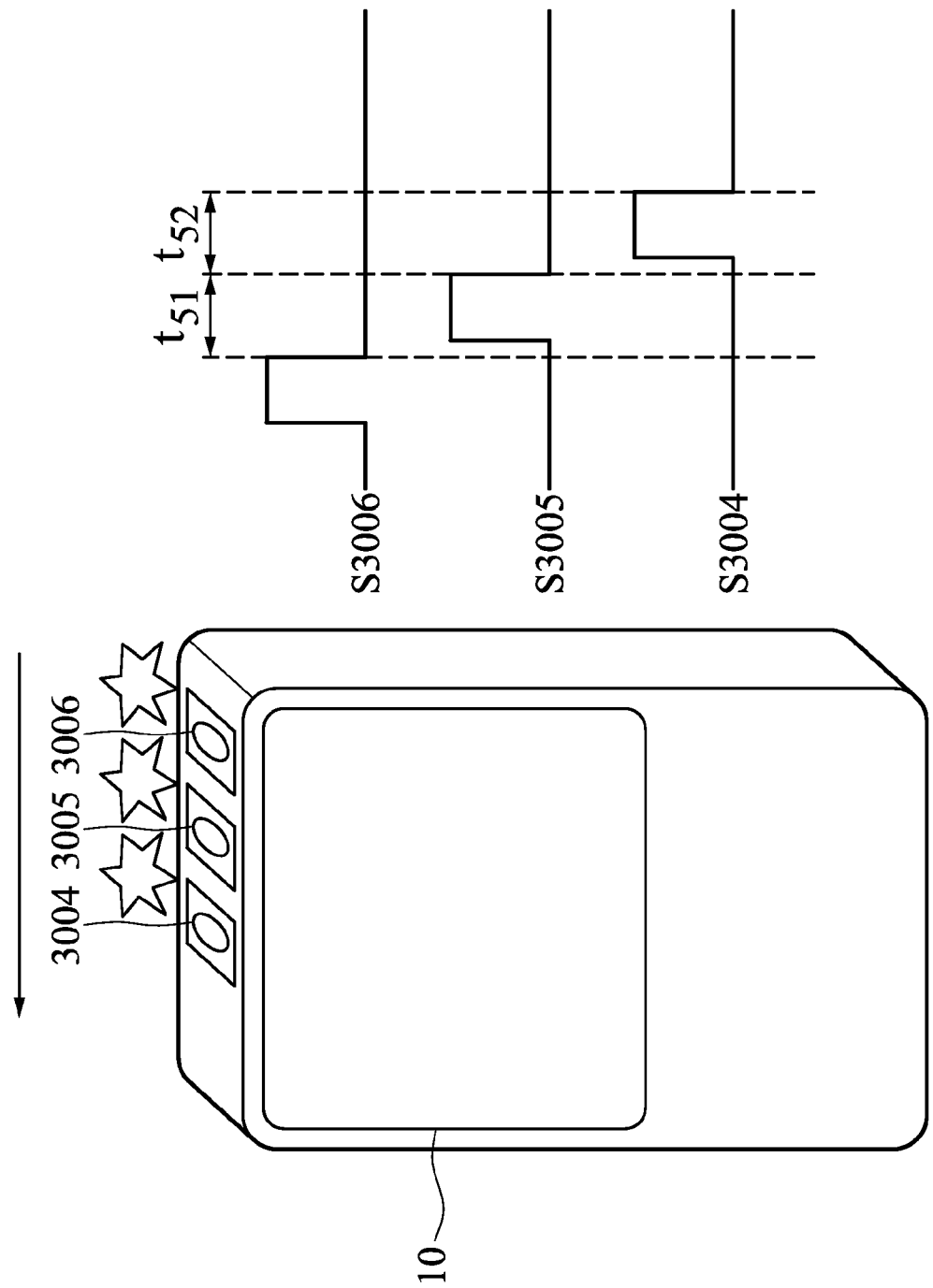
FIG. 3E shows a schematic diagram of a leftward slide on a side panel according to an embodiment of the invention.
Figure 3F:
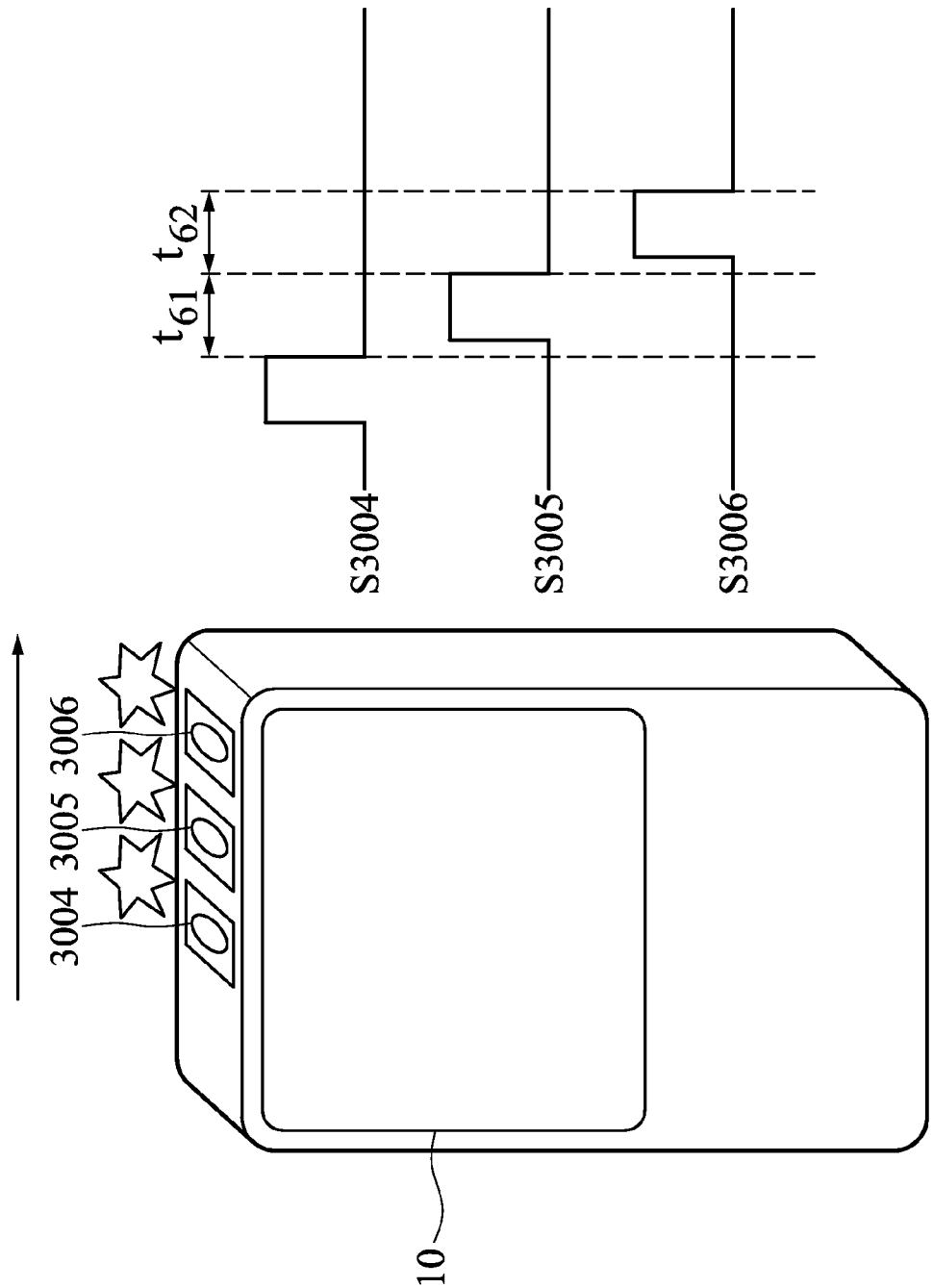
FIG. 3F shows a schematic diagram of a rightward slide on a side panel according to an embodiment of the invention.
Figure 3G:
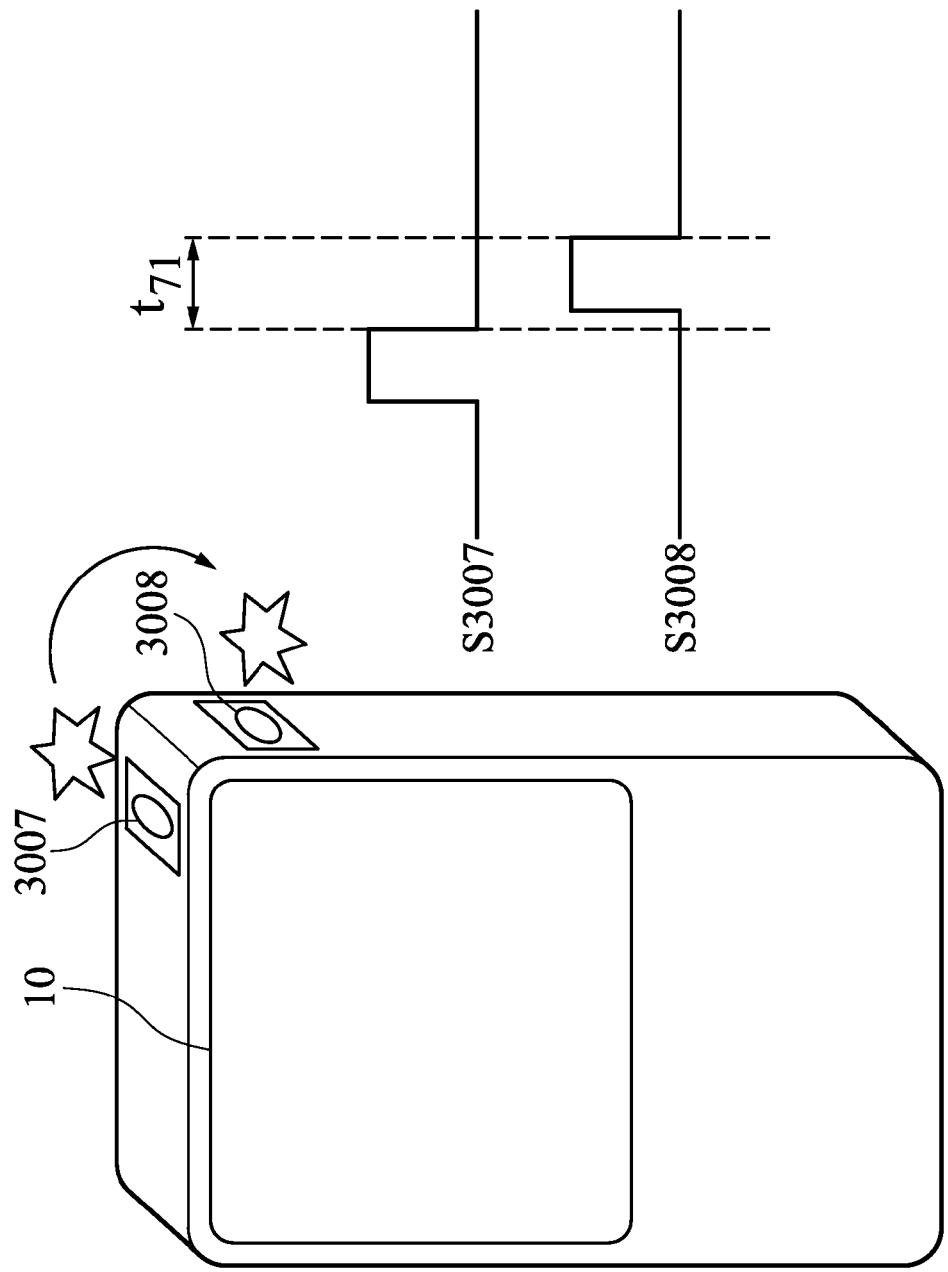
FIG. 3G shows a schematic diagram of a clockwise slide on two side panels according to an embodiment of the invention.
Figure 3H:
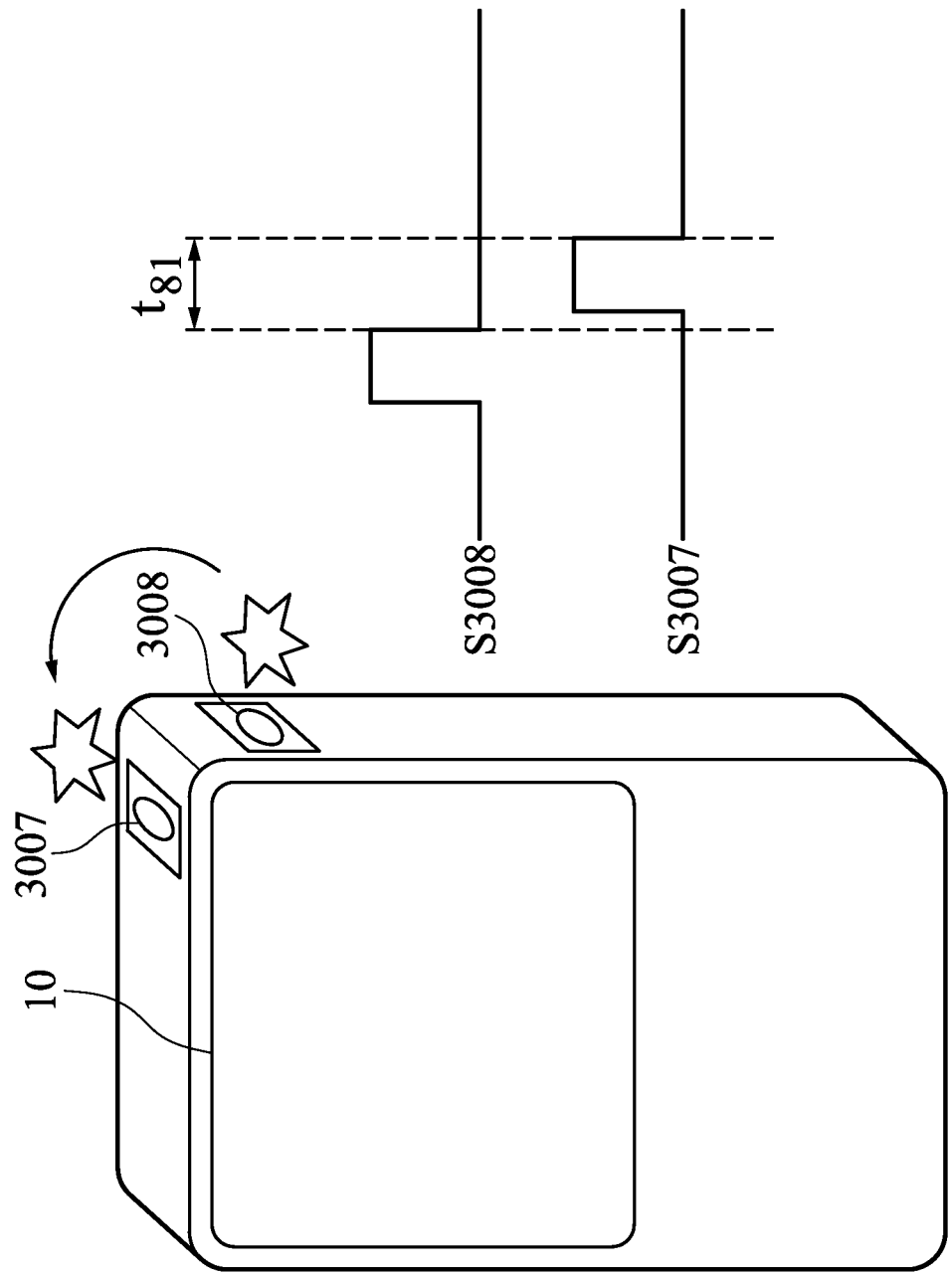
FIG. 3H shows a schematic diagram of a counterclockwise slide on two side panels according to an embodiment of the invention.
Figure 3I:
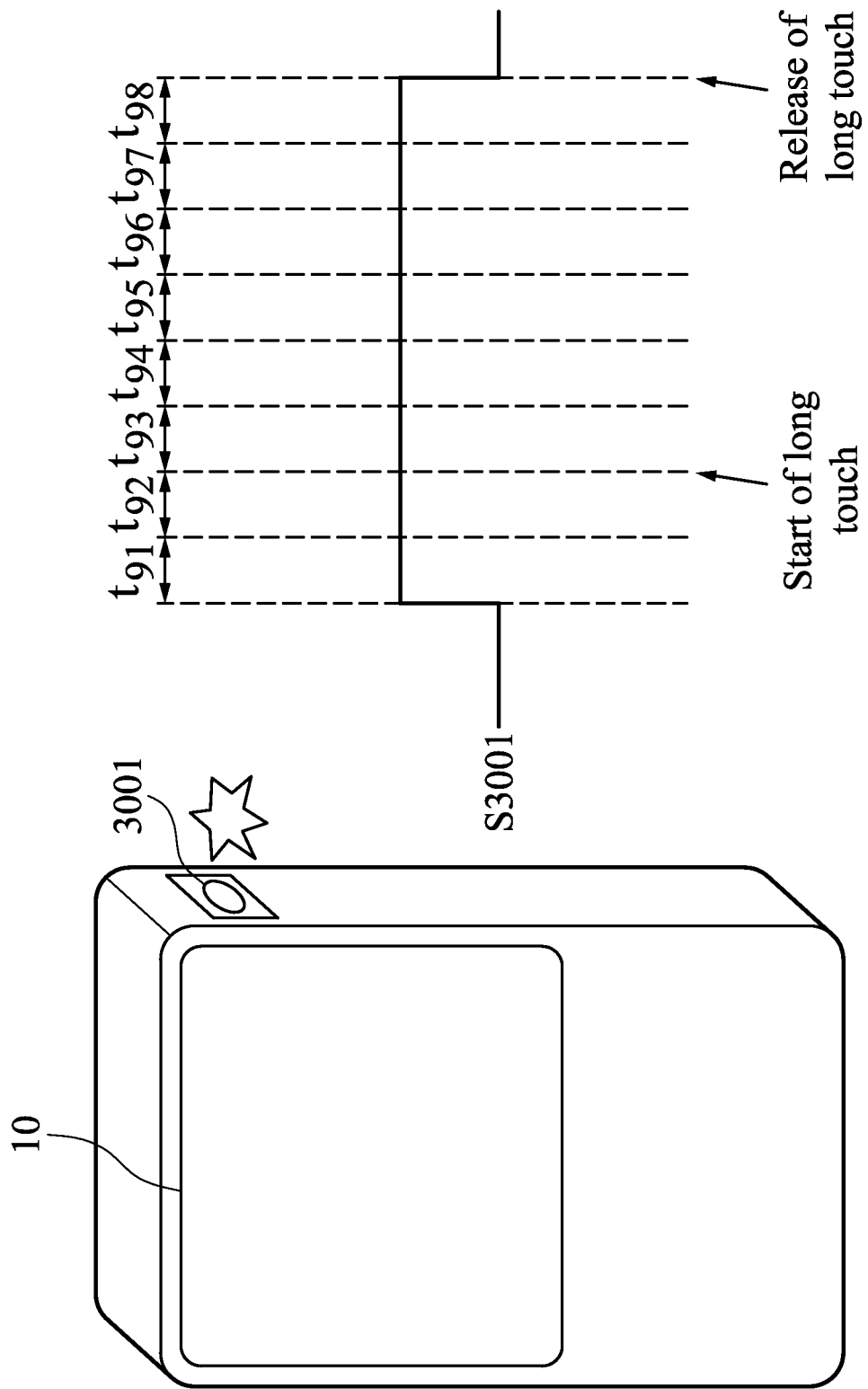
FIG. 3I shows a schematic diagram of a long touch on a side panel according to an embodiment of the invention.

An action type "touch" is defined as a single-touch of an object on the front panel 10 or side panel 20. To further clarify, a single touch is a contact of an object on a panel for a predetermined duration, or in the object-oriented programming terminology, a single touch can be defined as a keydown event instantly followed by a keyup event. The action type "double-touch" is defined as two touches spaced within a short interval. The short interval is normally derived from the human perceptual sense of continuousness, or is predetermined by the user's preferences. The action type "long-touch" is defined as a touch continues over a predetermined time period. While sensors are placed in a row or column, the action type "slide" is defined as multiple touches by an object starting with one end of multiple sensors and ending with the other end of sensors, where any two successive touches are limited into a predetermined time period. Particularly, the movement between the two positions on the panel is only in one single direction. When adding the moving direction, the action type "slide" can be further classified into "downward slide", "upward slide", "rightward slide", "leftward slide", "clockwise slide", and "counterclockwise slide". FIG. 3A shows a schematic diagram of a single touch with a signal S3001 corresponding to a location 3001 according to an embodiment of the invention. The signal S3001 becomes true for a certain amount of time $t_{11}$ when the sensor controller 220 detects an object touches the location 3001 of a right side panel, otherwise, becomes false. A successful single touch is determined by the system framework 240 when the time period $t_{11}$ is limited within a predetermined interval. FIG. 3B shows a schematic diagram of a double-touch with a signal S3001 corresponding to the location 3001 according to an embodiment of the invention. Once two single-touches are detected, a successful double-touch is determined by the system framework 240 when a time period therebetween $t_{23}$ is limited within a predetermined interval. FIG. 3C shows a schematic diagram of an upward slide with signals S3001 to S3003 corresponding to locations 3001 to 3003 respectively according to an embodiment of the invention. Three single-touches are detected in sequence via the sensors placed on or under locations 3003 to 3001 of the right side panel. The time interval $t_{31}$ between the termination of first and second single-touches, and the time interval $t_{32}$ between the termination of second and third single-touches are obtained by the system framework 240. A successful upward slide is determined by the system framework 240 when detecting each of time intervals $t_{31}$ and $t_{32}$ is limited within a predetermined time interval. The downward, leftward and rightward slides as shown in FIGS. 3D to 3F can be determined by a similar way, and are briefly described herein for brevity. FIG. 3G shows a schematic diagram of a clockwise slide with signals S3007 and S3008 corresponding to locations 3007 and 3008 of right side panels respectively according to an embodiment of the invention. Two single-touches are detected in sequence via the sensors placed on or under a location 3007 of the top side panel and a location 3008 of the right side panel. The time interval $t_{71}$ between the termination of single-touches corresponding to locations 3007 and 3008 is obtained. A successful clockwise slide is determined by the system framework 240 when detecting the time intervals $t_{71}$ is limited within a predetermined time interval. The counterclockwise slide as shown in FIG. 3H can be determined by a similar way, and is briefly described herein for brevity. Note that a successful slide of any type may be alternatively determined by detecting time intervals of starts of the single-touches, or a similar but different way. It is to be understood that any of the illustrated signals S3001 to S3008 may represent a signal asserted or de-asserted by the sensor controller 220, or information variation versus time stored in a register, a buffer, or memory, which is altered by the sensor controller 220. Those skilled in the art may detect more or less locations than described above to determine the mentioned "slide" actions depending on different design consideration, and the invention cannot be limited thereto. FIG. 3I shows a schematic diagram of a long touch with a signal S3001 corresponding to a location 3001 according to an embodiment of the invention. The signal S3001 becomes true when the sensor controller 220 detects an object touches the location 3001 of a right side panel, otherwise, becomes false when the sensor controller 220 no longer detects the touch, click or approximation. After detecting a touch, the system framework 240 further determines whether the detected one remains every time when a predetermined time interval elapses, such as the ends of $t_{91}$, $t_{92}$ to $t_{93}$ in turn. After detecting remaining of the touch twice, a successful long-touch is determined by the system framework 240 until that is no longer detected (also called release of long-touch).

Figure 4:
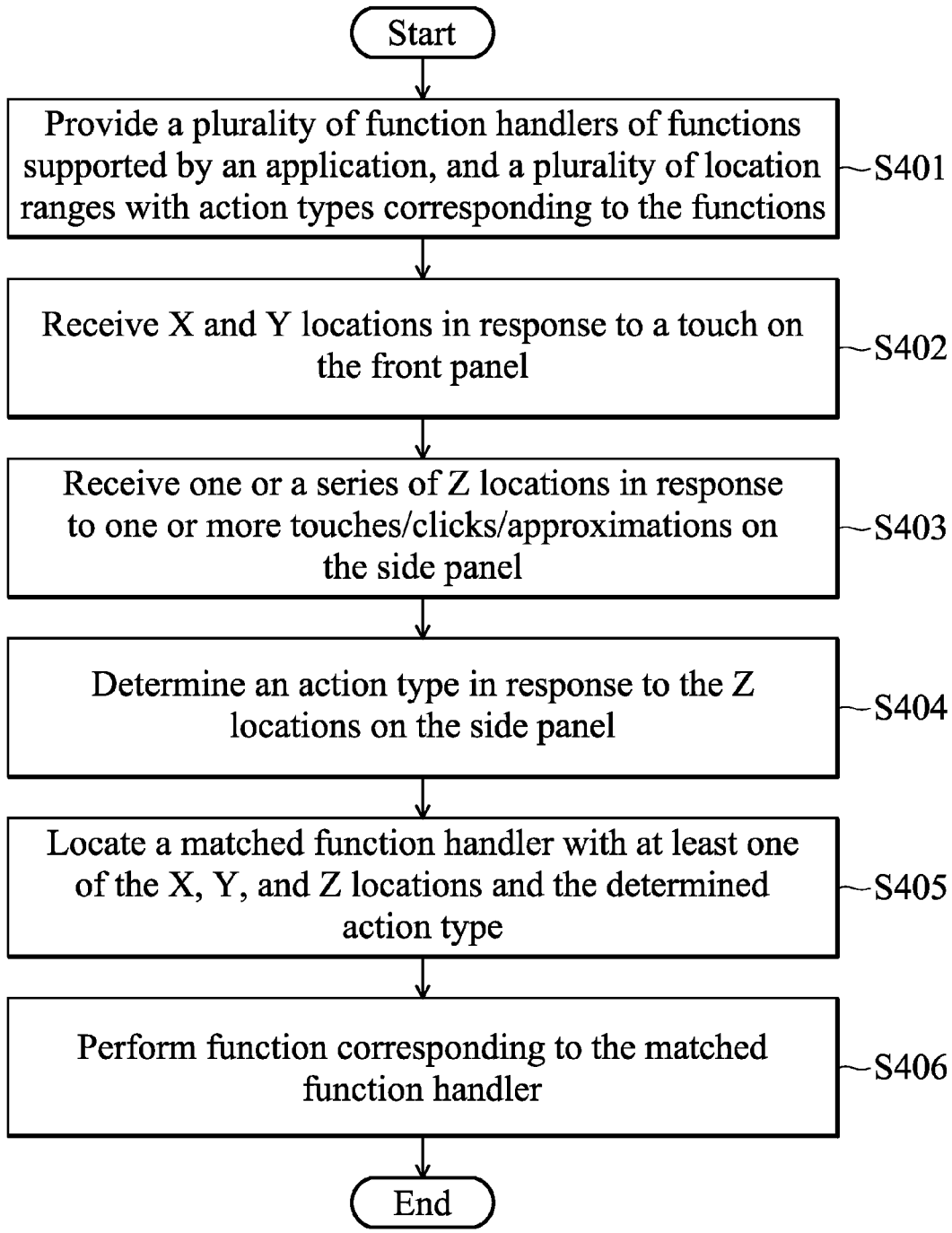
FIG. 4 is a flow chart of an embodiment of a method for providing 3D-like interaction with extended touch panel according to the invention.

Referring to FIG. 4, a flow chart of an embodiment of a method for providing 3D-like interaction with extended touch panel is shown according to the invention. The process is applied to a touch sensitive device with a front panel and a side panel disposed on the front surface and one of the side surfaces respectively. Initially, when an application is selected to be executed and its UI is displayed on the front panel, the function handlers of the functions supported by the selected application, and the location ranges of the side panels with action types corresponding to the functions are provided (step S401). Each mapping between a function handler and a location range with an action type may be pre-stored in a storage module 250, which is registered to a system framework by an application module. Later on, X and Y locations are received from a sensor controller upon detecting a touch on the front panel (step S402). Similarly, a Z location or a series of Z locations are received from the sensor controller upon detection of one or more touches on the side panel (step S403). An action type is determined in response to the Z location(s), which may indicate a "single-touch", "double-touch", "long-touch", "downward slide", "upward slide", "rightward slide", "leftward slide", "clockwise slide", and "counterclockwise slide" on the side panel (step S404). With the detected touch locations and determined action type, a matched function handler is located by searching a mapping table (for example, the LRU Interval Tree table 251) (step S405). Consequently, at least one function corresponding to the matched function handler is performed (step S406).

Figure 5:
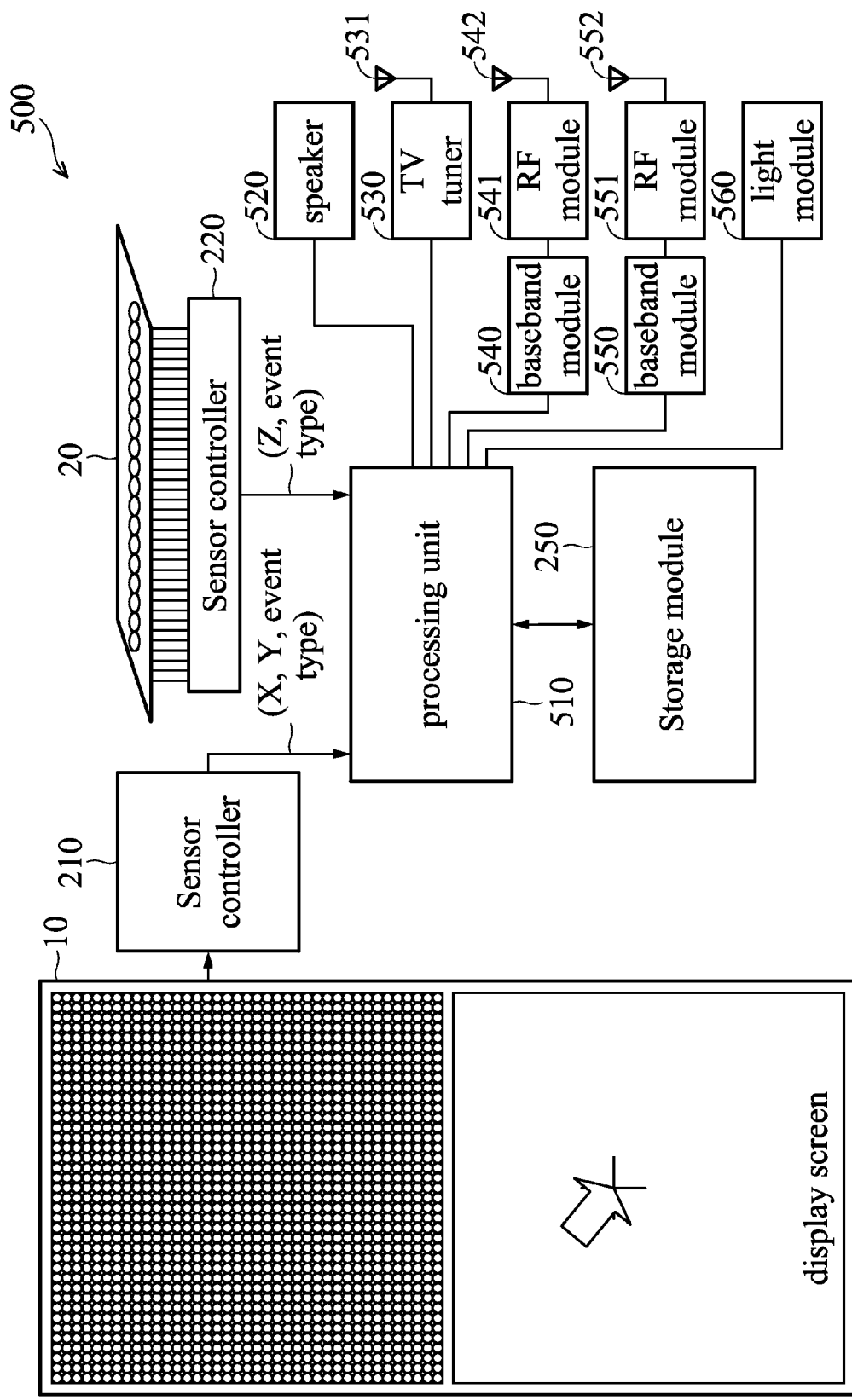
FIG. 5 is a block diagram illustrating another embodiment of the system architecture of the device 1 of FIG. 1.

In some embodiments, a processing unit is employed to provide the interaction of the invention, including the provision of the registration information, the determination of the action type of the touches on the side panels, and the execution of the applications. FIG. 5 is a block diagram illustrating another embodiment of the system architecture of the device 1. The same numerals in FIG. 5 represent the same elements in FIG. 2, and for descriptions of the front panel 10, the side panel 20, the sensor controllers 210 and 220, and storage module 250, reference may be made to FIG. 2. In the system 500, the processing unit 510 registers the function handlers of the functions supported by each application, maintains the registration information in the storage module 250. The registration information in the storage module 250 may be maintained in the form of an LRU Interval Tree. With the LRU Interval Tree data structure, the look-up time may be shortened as desired. Alternatively, a T-tree structure may be used to maintain the registration information instead, in order to minimize the space needed for storage. The storage module 250 may be a volatile memory or a non-volatile memory storing program codes of the applications supported by the system 500. In addition, the processing unit 510 records a location range of the side panel 20 with an action type for activating each registered function of a particular application. When an object touches or approximates the side panel 20, the sensor controller 220 generates signals indicating the touch with a location and an event type related thereto. The event types may include "keyup", "keydown", "drag", "drop", "touch", "double-touch" and so on. Upon receiving the signals from the sensor controller 220, the processing unit 510 determines an action type according to the signals, and searches the storage module 250 for the matched function handler based on the touch location and the action type. The action types may include "single-touch", "double-touch", "upward slide", "downward slide", "leftward slide", "rightward slide", "clockwise slide" or "counterclockwise slide", and so on. Consequently, the processing unit 510 retrieves the program codes of the application corresponding to the matched function handler from the storage module 250, and performs the application by executing the retrieved program codes. The applications may include a media player for playing of a particular multimedia file, such as an ".AAC", ".WAV", ".MP3", ".MP4" file, or others, an image viewer for displaying a particular image file, such as an "JPG", "BMP", "GIF", or others, a digital/analog TV application for displaying analog or digital TV broadcasts, a navigation application for displaying maps and navigation information, a light controlling application for controlling the light module of the device 1, a text editor/viewer for editing or displaying the characters within text files or text messages, a listing application for displaying data items in a list format, a virtual scratch board for users to writing words or drawing figures thereon, a gaming application for executing video games, and etc. During execution of the applications, the corresponding function(s) performed by the processing unit 510 adjusts the GUI on the display screen of the front panel 10, controls other system module(s) corresponding to the performed function (s), such as a speaker 520 for broadcasting the voice signals generated by the media player application, a TV tuner 530 and an antenna 531 for receiving the TV signals of a digital/analog TV application, a baseband module 540, an RF module 541, and an antenna 542 for transceiving the wireless communications signals, a baseband module 550, an RF module 551, and an antenna 552 for receiving the Global Positioning System (GPS) signals, and a light module 560 for controlling the brightness of the emitted light, and/or operates one or more peripheral devices, such as a microphone, a speaker, a camera module, a mass storage device, or any combinations thereof. The performed processes of the processing unit 510 each contains a series of program codes to be executed by the processing unit 510. The processing unit 510 may be a general-purposed processor or an MCU, or others, embedded in the system 500.

Figure 6:
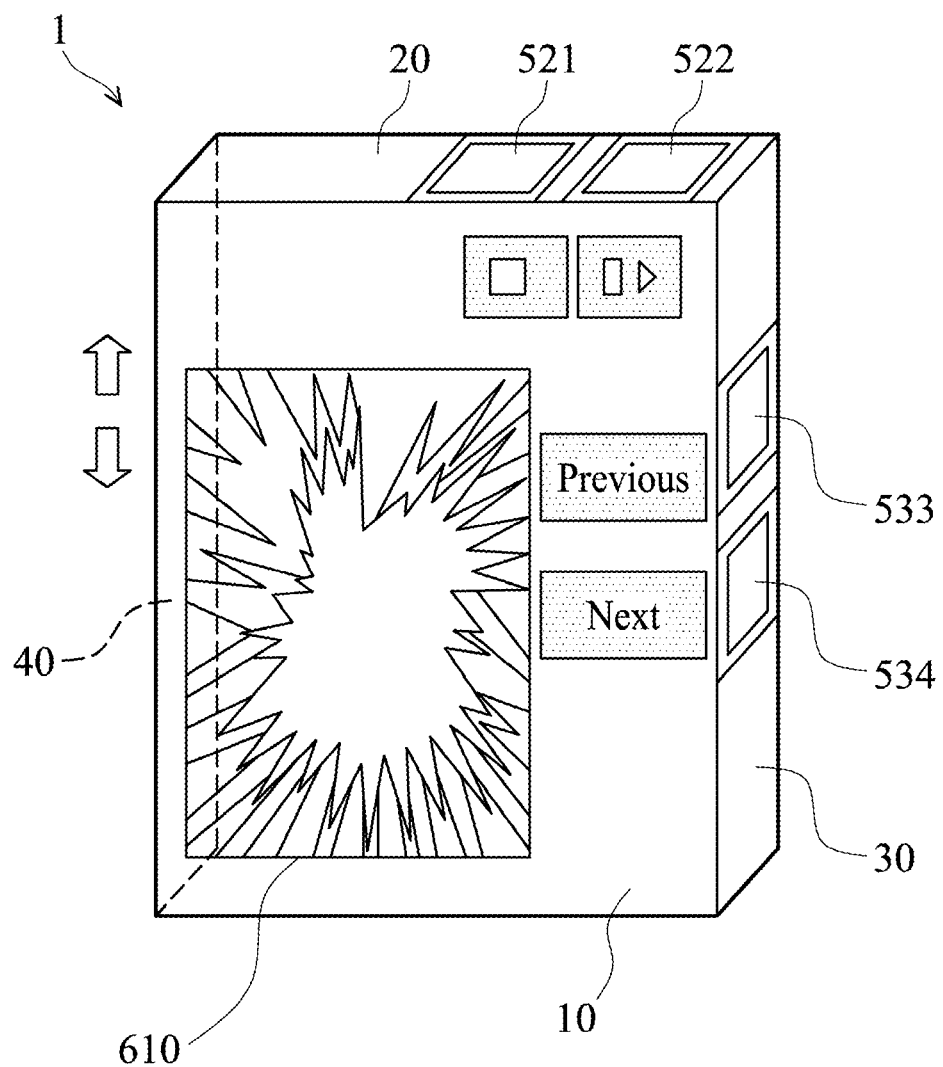
FIG. 6 is a block diagram illustrating an MMI with soft keys for a media player application in accordance with an embodiment of the invention.

In the following, interaction of the invention is described with embodiments of soft key configurations for various applications in the system 200. The soft key refers to, herein, a virtual button simulated by a specific area of any of the side panels of the device 1, invoking a particular function when the area is touched. Referring to FIG. 6, an MMI with soft keys for a media player application is shown. The main screen 610 of the media player application is displayed on the lower-left region of the front panel 10. The side panel 20 on the top of the device 1 provides two soft keys. One is a play/pause key 621 and the other is a stop key 622. On the respective locations of the front panel 10, two respective prompt icons are displayed to indicate a user the locations of the soft keys 621 and 622. By referring the prompt icons, the user realize that a multimedia file can be played or paused by touching the play/paused key 621, and stopped by touching the stop key 622. The multimedia file contains graphics, animation, audio or video, or any combinations thereof. Similarly, a right side panel 30 of the device 1 provides a forward key 633 and a backward key 634, and a left side panel 40 of the device 1 provides a region to facilitate the control for volume adjustment. On the respective locations of the front panel 10 corresponding to the forward key 633 and backward key 634, two respective prompt icons are also displayed. In this manner, the user can easily use one hand to operate the device 1 to interact with the media player application. To turn the volume up, the user simply needs to trigger an "upward slide" action via the left side panel 40. To turn down the volume down, a "downward slide" action needs to be triggered via the left side panel 40. When executed by the processing unit 510, for example, the media player application amplifies a gain of audio signals to the speaker 520 of the device 1 or an earphone connecting to the device 1 when receiving signals indicating an upward slide action on the left side panel while suppresses the gain when detecting a downward slide action thereon.

Figure 7:
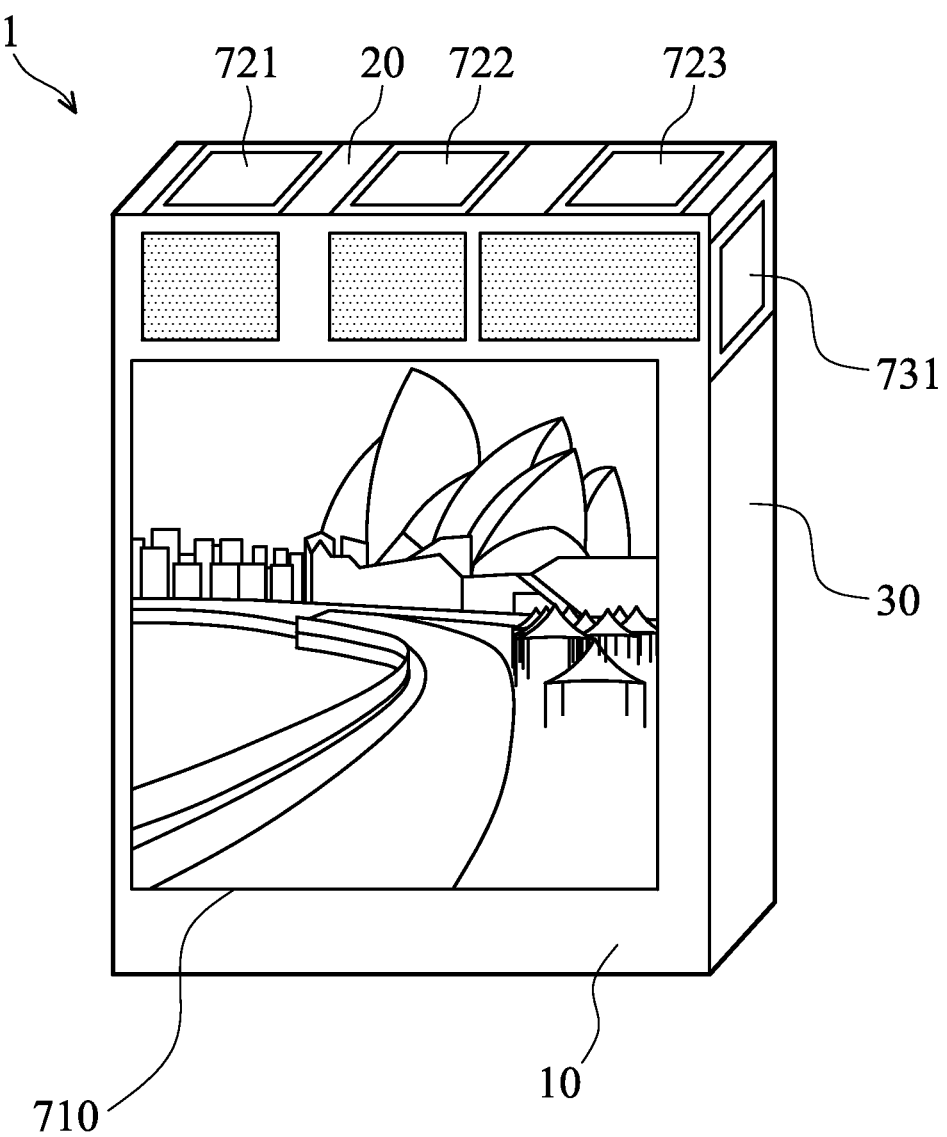
FIG. 7 is a block diagram illustrating an MMI with soft keys for an image viewer application in accordance with an embodiment of the invention.

FIG. 7 is a schematic diagram illustrating an MMI with soft keys for an image viewer application in accordance with an embodiment of the invention. The main screen 710 of the image viewer application is displayed on the lower region of the front panel 10. The top side panel 20 of the device 1 provides three soft keys: a rotation key 721, an invert key 722, and a zoom-in key 723. The right side panel 30 of the device 1 provides the zoom-out key 731. Four respective prompt icons are displayed on the front panel 10 to indicate the locations corresponding to the soft keys on the top and right side panels 20 and 30 to a user. The image displayed in the main screen 710 may be clockwise or counterclockwise rotated in a specific angel every time the rotation key 721 is touched, thereby directing the front panel 10 to display the rotated image. Alternatively, the image displayed in the main screen 710 may be rotated in a specific angel repeatedly after detection of the rotation key 721 being long touched. Then, the image viewer application stops rotating when detecting a release of the rotation key 721. Furthermore, the user may long touch the zoom-in key 723 or the zoom-out key 731 to zoom in or out of the view of the displayed image and release the zoom-in key 723 or the zoom-out key 731 when the displayed image is viewed at a desired level. When executed by a processor or MCU, for example, the image viewer application continues to enlarge the image by interpolating more pixels therein and then display the interpolated image in a viewable zone when receiving signals indicating a long-touch action on the zoom-in key 723, thereby directing the front panel 10 to display the enlarged image. Alternatively, for example, the image viewer application continues to reduce the original image by removing pixels out of the original image with anti-aliasing and display the reduced image in the viewable zone when detecting signals indicating a long-touch action on the zoom-out key 731, thereby directing the front panel 10 to display the reduced image.

Figure 8:
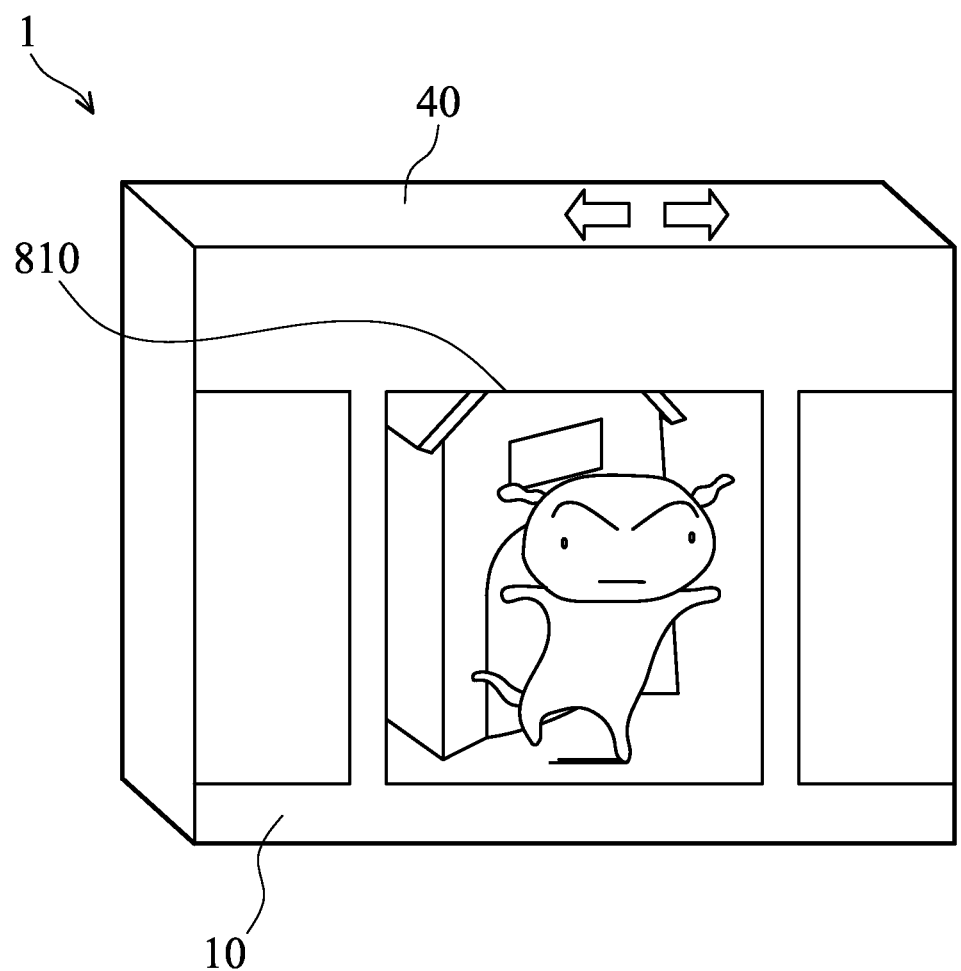
FIG. 8 is a block diagram illustrating an MMI for a digital/analog TV application in accordance with an embodiment of the invention.

FIG. 8 is a schematic diagram illustrating an MMI for a digital/analog TV application in accordance with an embodiment of the invention. The main screen 810 of the digital/analog TV application is displayed at the center of the front panel 10. It is noted that the front panel 10 is placed with the left or right side facing upward, so as to provide a larger scale of the video streams. The left side panel 40 provides the control for channel changing. To channel up, the user simply needs to trigger a "rightward slide" action on the left side panel 40. To channel down, a "leftward slide" action needs to be triggered on the left side panel 40. Alternatively, the direction of the slide action may be conversely configured to satisfy different user preferences. When executed by the processing unit 510, for example, the digital/analog TV application directs the TV tuner 530 of the device 1 to tune in a specific frequency for receiving TV signals corresponding to the switched channel when receiving signals indicating a leftward or rightward slide on the left side panel 40. In addition, the digital/analog TV application further directs the speaker 520 to broadcast the acoustic signals of the TV signals. Analog TV signals may be broadcasted by the NTSC (National Television System Committee), PAL (Phase Alternating Line) or SECAM (SEquential Couleur Avec Memoire) system, or others. Digital TV signals may be broadcasted by the DVB (Digital Video Broadcasting), ATSC (Advanced Television Systems Committee), ISDB (Integrated Services Digital Broadcasting) or DMB (Digital Multimedia Broadcasting) system, or others. In addition, the MMI may also be utilized by the image viewer application when browsing multiple images. A "rightward slide" action causes flipping forward to the next image and a "leftward slide" action causes flipping back to the previous image, or the other way around. When executed by a processor or MCU, for example, the image viewer application reads the next or the prior image from a storage device of the device 1 and display on the front panel 10 when receiving signals indicating a leftward or rightward slide action on the left side panel 40. The storage device may be a CF (Compact Flash), MD (Micro Drive) or MS (Memory Stick) card, or a similar but different non-volatile storage device.

Figure 9A:
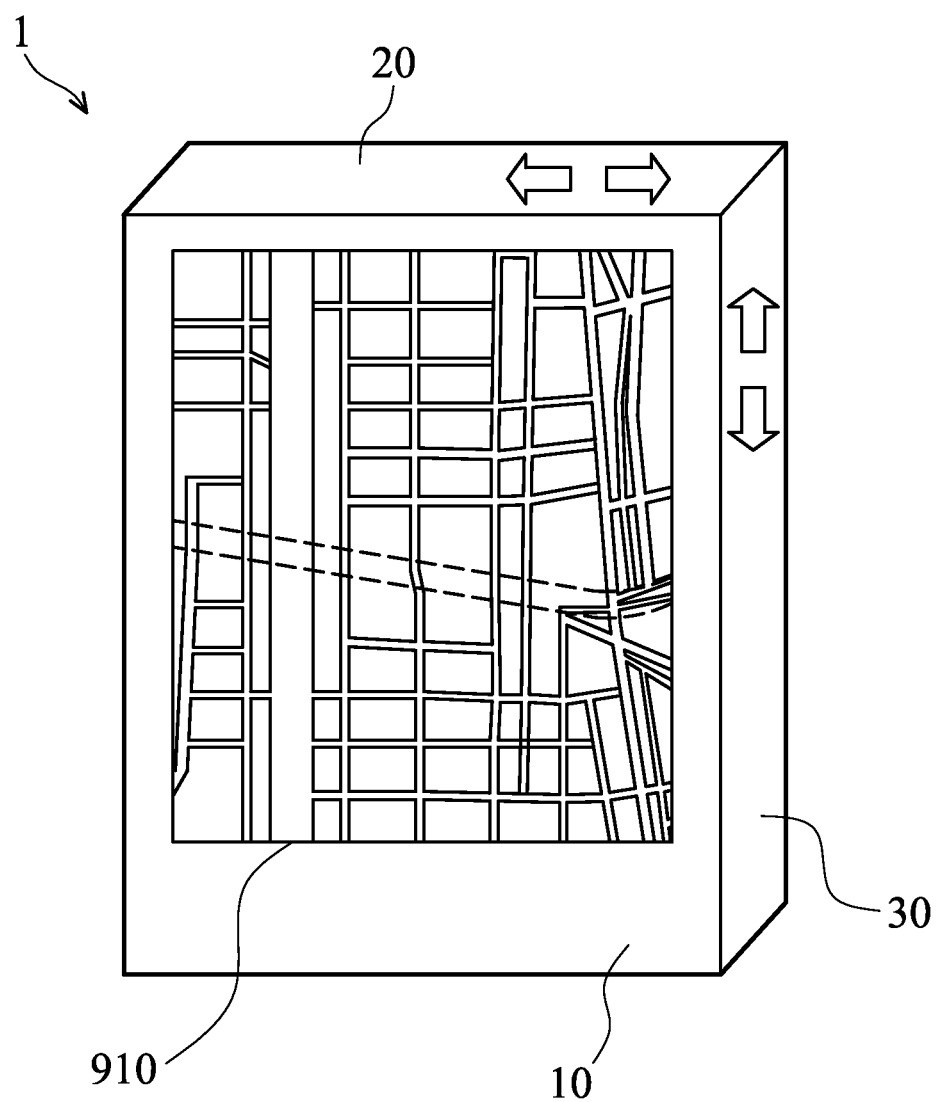
FIG. 9A is a block diagram illustrating an MMI for a navigation application in accordance with an embodiment of the invention.
Figure 9B:
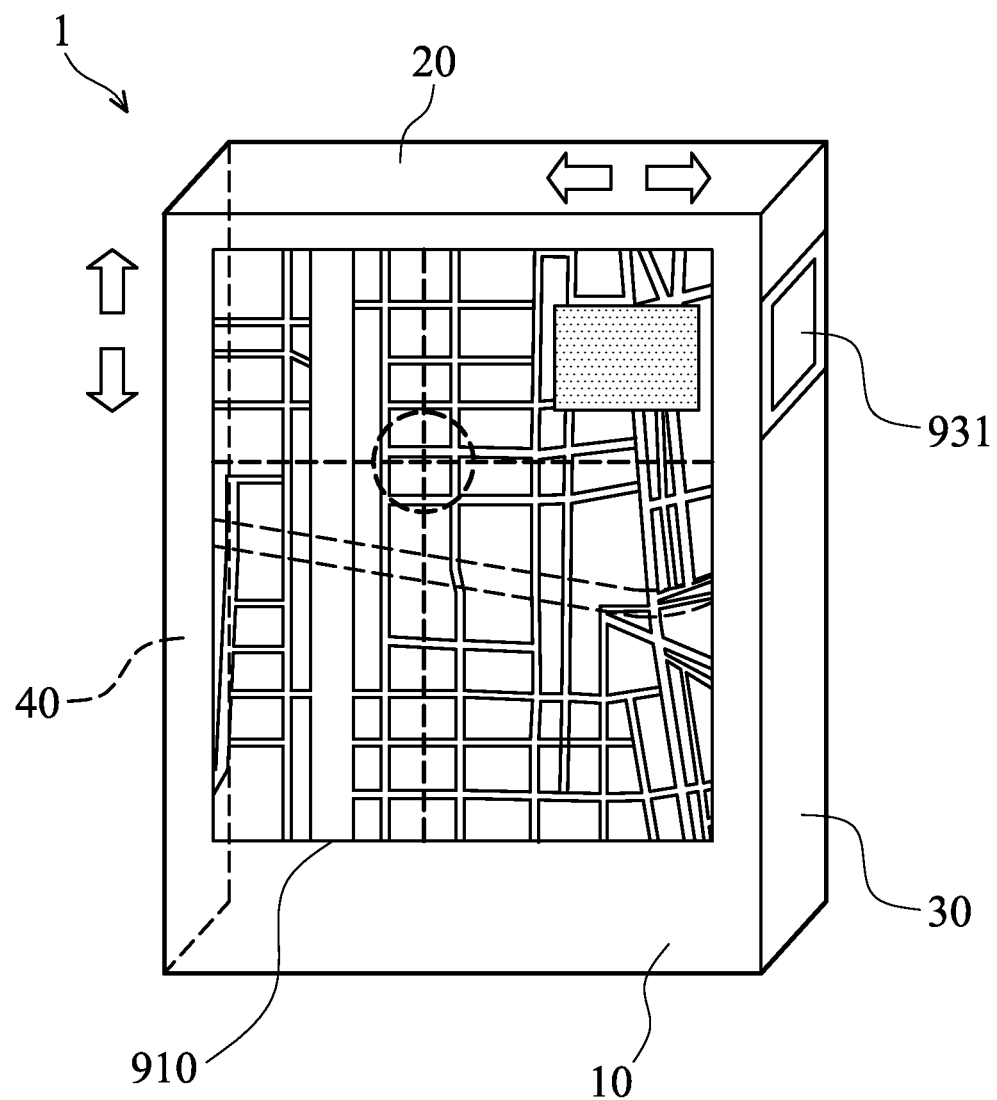
FIG. 9B is a block diagram illustrating a variant of the MMI for the navigation application in FIG. 9A.

FIG. 9A is a schematic diagram illustrating an MMI for a navigation application in accordance with an embodiment of the invention. The navigation application is commonly provided in navigation devices or mobile phones with or without GPS functions. The main screen 910 displays a digital map in the center of the front panel 10. The top side panel 20 of the device 1 provides a horizontal scroll control, and the right side panel 30 of the device 1 provides a vertical scroll control. Intuitively, the map will be scrolled to the east by sliding any object on the top side panel 20 right, and be scrolled to the west by sliding any object on the top side panel 20 left. Similarly, the digital map will be scrolled to the south by sliding any object on right the side panel 30 down, and be scrolled to the north by sliding any object on the right side panel 30 up. In this manner, the browsing of maps does not require the front panel 10 to be touched, thus, improving user experience. When executed by a processor or MCU, for example, the navigation application reads a relevant portion of the digital map from a storage device of the device 1 and displays on the front panel 10 according to the received signal indicating a leftward or rightward slide action on the top side panel 20, or a upward or downward slide action on the right side panel 30. In a variant of the MMI for the navigation application, referring to FIG. 9B, the vertical and horizontal scroll controls are provided by the top and left side panels 40 and 20 respectively, and a focus key 931 is provided by the right side panel 30. By long pressing or touching the focus key 931, the navigation application can be switched between a browsing mode and a resizing mode. Control mechanism via the top and left side panels 20 and 40 may refer to the description of FIG. 9A. When entering the resizing mode, the navigation application locks current view of the digital map (that is, the displayed map cannot be scrolled in any direction) and a focus area is shown on the map, represented by a circle located at the intersection between horizontal and vertical dashed lines. The scroll controls on the top and left side panels 20 and 40 are utilized to move the focus area horizontally and vertically on the locked view of the digital map. When detecting a single-touch action on the focus key 931, the navigation application enlarges a portion of the displayed map in or around the focus area to fit the main screen 910, and then, displays (also called zoom-in the display map). Conversely, when detecting a double-touch action on the focus key 931, the navigation application reduces the displayed map, and then, displays in the main screen 910. Alternatively, the digital map may be stored in a remote server on the Internet and the device 1 may support one or more wireless communication technologies, such as Wireless Fidelity (WiFi), Global System for Mobile communications (GSM), Wideband Code-Division Multiple Access (WCDMA), etc. When executed by the processing unit 510, the navigation application directs the baseband module 540 to accordingly control the RF module 541 and the antenna 542 to tune in a specific frequency band according to the supported wireless communications technology, and to receive the data signals regarding the relevant portion of the digital map from the remote server, according to the touch signal from the top side panel 20 or the right side panel 30. Furthermore, during the execution of the navigation application, the GPS functions may be enabled for providing positioning information to be incorporated into the displayed map. With the GPS functions enabled, the navigation application, when executed by the processing unit 510, directs the baseband module 550 to accordingly control the RF module 551 and the antenna 552 to tune in the GPS frequency band, and to receive the GPS signals.

Figure 10:
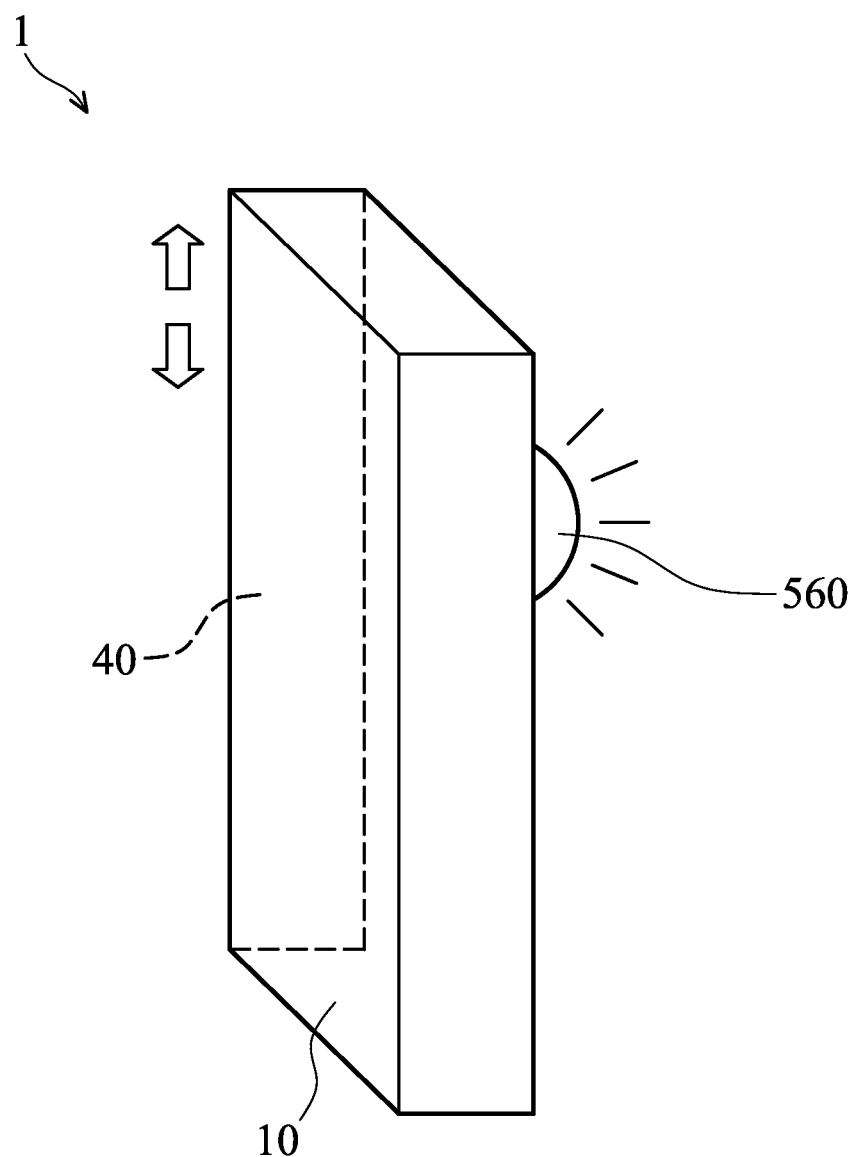
FIG. 10 is a block diagram illustrating an MMI for controlling the light module in accordance with an embodiment of the invention.

FIG. 10 is a schematic diagram illustrating an MMI for controlling a light module in accordance with an embodiment of the invention. A light module 560 is located in the back panel of the device 1 and is used as a flashlight. The light module may be an LED (Light Emitting Diode) generating light when the light condition of the environment is bad. Whenever there is a need to have sufficient light, the user may turn on the light module 560, and adjust brightness of the emitted light by sliding any object on the left side panel 40 up or down. The light module 560 may include a Pulse Width Modulation (PWM) circuit for controlling the input power to affect the brightness. When detecting that an "upward slide" action occurs on the side panel 40, an executed light control application generates a control signal to level up the input voltage to the PWM circuit to increase the input power of the light generating means; and thus, the brightness of the light generated by the light module 560 is scaled up. On the other hand, when detecting that a "downward slide" action occurs on the side panel 40, another control signal is generated to level down the input voltage to the PWM circuit to decrease the input power of the light generating means; and thus, the brightness of the light generated by the light module 560 is scaled down.

Figure 11:
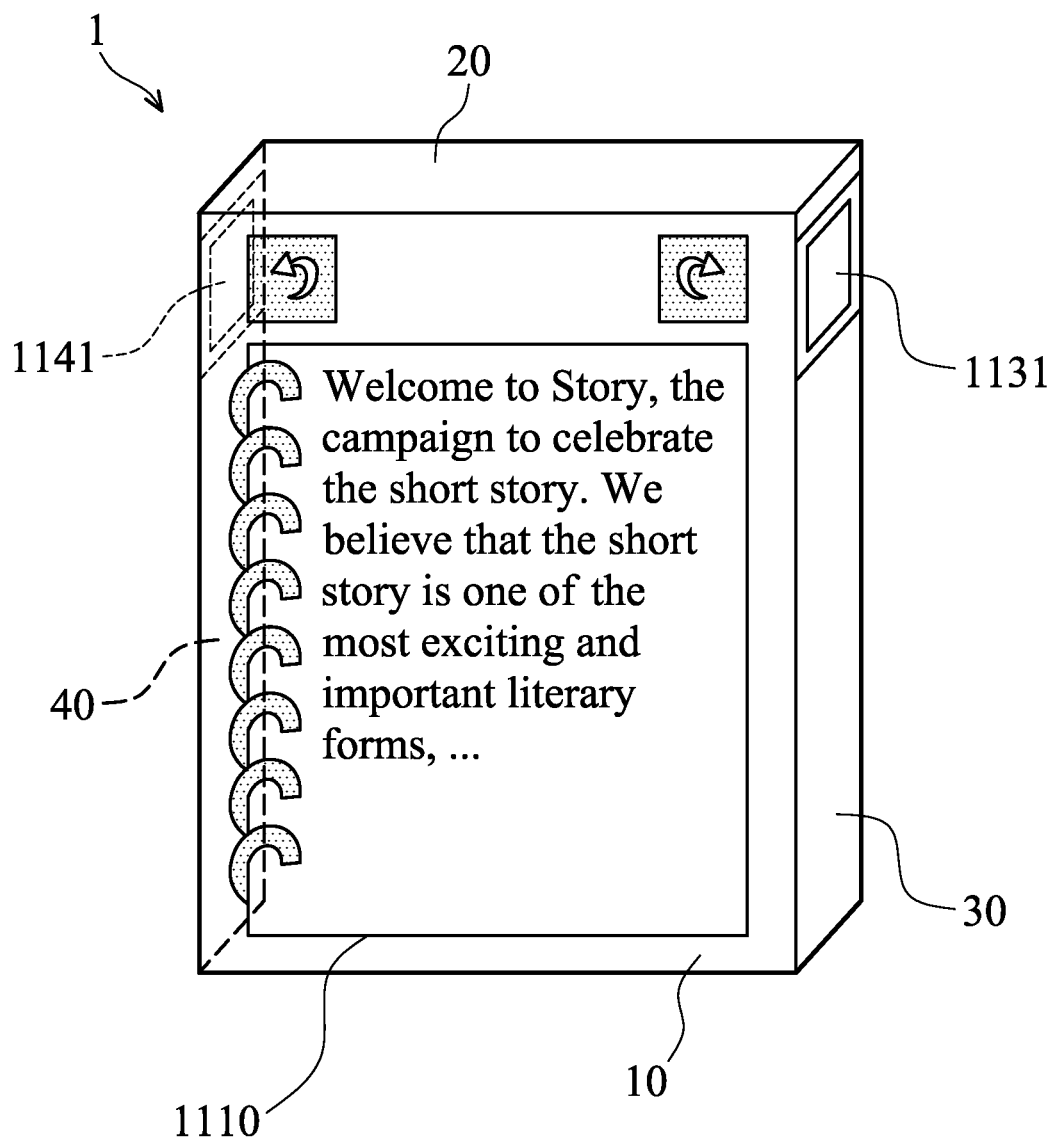
FIG. 11 is a block diagram illustrating an MMI with soft keys for a text viewer application in accordance with an embodiment of the invention.

FIG. 11 is a schematic diagram illustrating an MMI with soft keys for a text viewer application in accordance with an embodiment of the invention. The main screen 1110 displays a virtual booklet on the front panel 10. A short message, content of a text file, or others, is displayed page-by-page if its length is beyond the maximum display capability of the virtual booklet. The right side panel 30 of the device 1 provides a flip-forward key 1131, and the left side panel 40 of the device 1 provides a flip-backward key 1141. On the respective locations of the front panel 10, two respective prompt icons are displayed to indicate the locations of the soft keys 1131 and 1141 to a user. The text viewer application, when executed by a processor or MCU, loads and segments a text message into pages and displays one page in the main screen 1110. When detecting a single-touch, double-touch or long-touch action, or others, via the flip-forward key 1131, the text viewer application loads and displays the next page on the main screen 1110. Conversely, the prior page is loaded and displayed when detecting that via the flip-backward key 1141.

Figure 12:
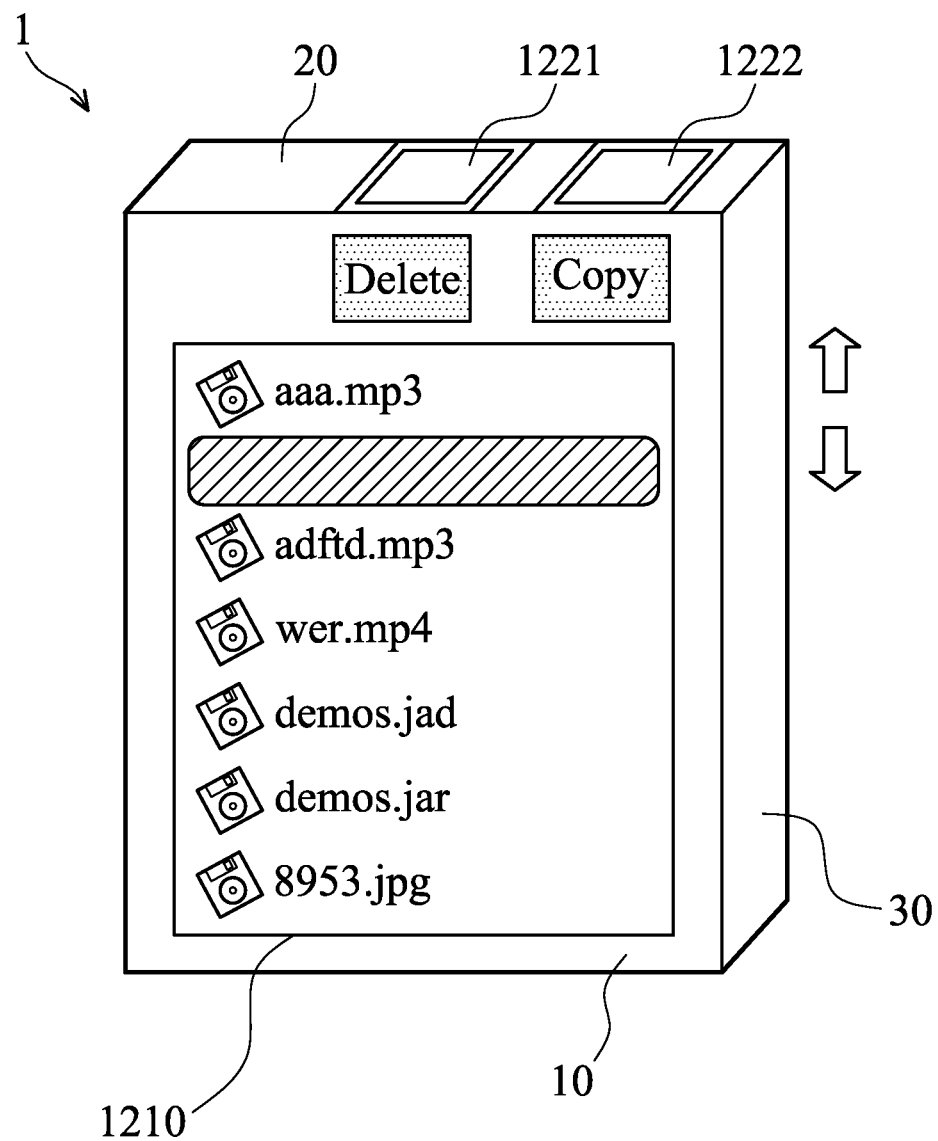
FIG. 12 is a block diagram illustrating an MMI with soft keys for a listing application in accordance with an embodiment of the invention.

FIG. 12 is a schematic diagram illustrating an MMI with soft keys for a listing application in accordance with an embodiment of the invention. The main screen 1210 displays a plurality of data items in a list format. The top side panel 20 of the device 1 provides a delete key 1221 and a copy key 1222, and the right side panel 30 of the device 1 provides control for moving the highlight. By sliding up or down any object on the side panel 40, the highlight will move up or down accordingly. A user may touch on the delete key 1221 to delete a data file from a storage device or a data record from a database, associated with the highlighted item. The deletion of the data file may be achieved by manipulating a file system, such as the FAT (File Allocation Table), HPFS (High Performance File System) or NTFS system, or others. The listing application may be utilized in browsing files, contacts, or any other data items stored in the device 1.

Figure 13:
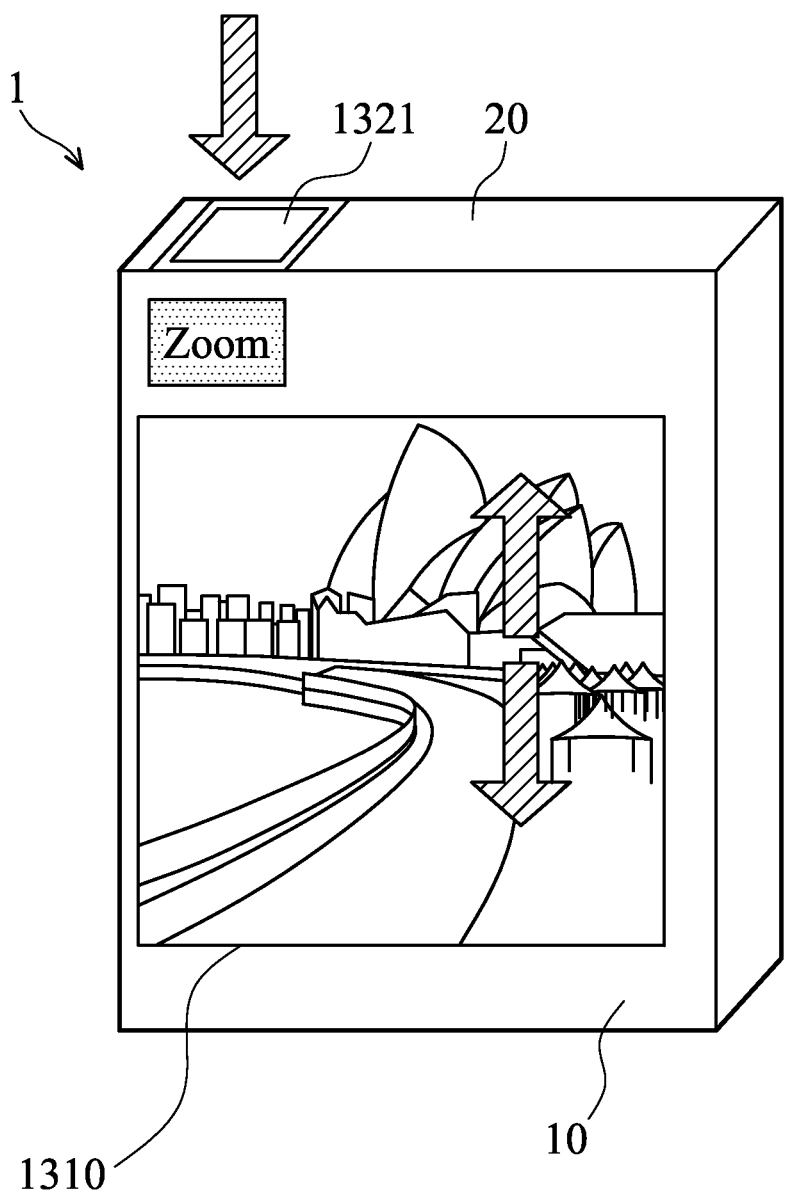
FIG. 13 is a block diagram illustrating an MMI with soft function keys for an image viewer application in accordance with an embodiment of the invention.

In the following, 3D-like interaction of the invention is described with embodiments of soft function key configurations for various applications in the system 200 or 500. The soft function key refers to, herein, a virtual button simulated in a specific area of any of the side panels of the device 1, changing the default control configuration of the MMI when the area is touched. FIG. 13 is a schematic diagram illustrating an MMI with soft function keys for an image viewer application in accordance with an embodiment of the invention. A main screen 1310 is displayed on the front panel 10. The top side panel 20 of the device 1 provides a zoom-in/out function key 1321. A respective prompt icon is displayed on the front panel 10 to indicate the location of the zoom-in/out function key 1321 to the user. While the zoom-in/out function key 1321 is not touched, sliding any object on the front panel 10 causes horizontal or vertical scrolling of an image in the main screen 1310. Alternatively, while the zoom-in/out function key 1321 is touched, upward sliding an object, e.g., an index finger, on the front panel 10 triggers a zoom-in of the image in the main screen 1310, while downward sliding an object triggers zoom-out of the image therein. In short, the zoom-in/out function key 1321 is utilized to change the control configuration of the MMI from scrolling (default) to zooming. The image viewer application, when executed by a processor or an MCU, provides two action handling procedures one being triggered to respond to upward and downward slides on the front panel 10 when the zoom-in/out function key 1321 is being touched, otherwise, triggers the other.

Figure 14:
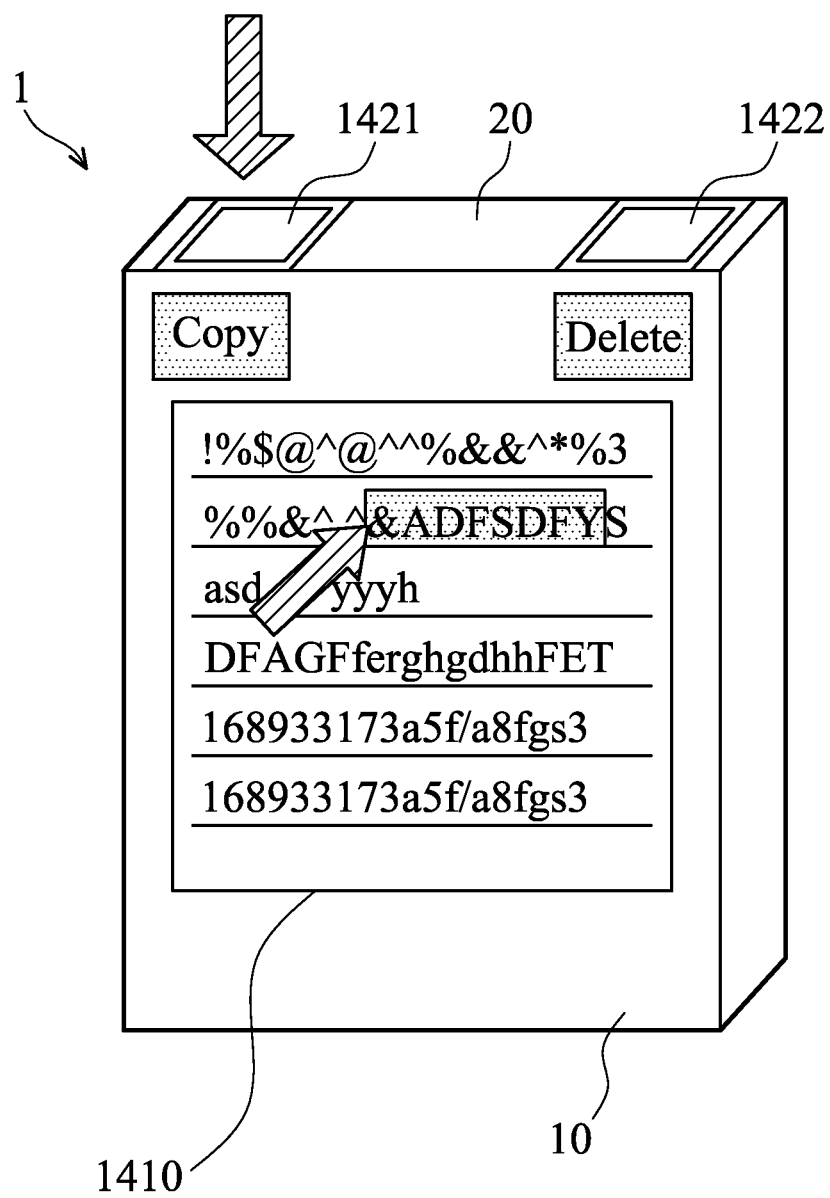
FIG. 14 is a block diagram illustrating an MMI with soft function keys for a text editor application in accordance with an embodiment of the invention.

FIG. 14 is a schematic diagram illustrating an MMI with soft function keys for a text editor application in accordance with an embodiment of the invention. A main screen 1410 is displayed on the front panel 10. The top side panel 20 of the device 1 provides a copy function key 1421 and a delete function key 1422. Two respective prompt icons are displayed on the front panel 10 to indicate the location of the copy function key 1421 and the delete function key 1422 to the user. The default control configuration of the MMI on the front panel 10 is active when the soft function keys are not touched, otherwise, the control configuration is switched to another one in response to which function key is touched. For a "drag" action on the front panel 10, the text editor application, when executed by a processor or an MCU, provides three action handling procedures: one is triggered when the function keys 1421 and 1422 are not touched or pressed. Otherwise, the other two handling procedures are selectively triggered based on which function key is touched. For example, with no touch actions on the function keys 1421 and 1422, when receiving a signal indicating a slide action over several characters displayed on the main screen 1410, a marking procedure is started to highlight the related characters. Alternatively, with a touch action on the function key 1421, when receiving the mentioned signal, a copy procedure is started to duplicate the related characters in a memory of the device 1 (the memory may be referred to as a clipboard), which are ready to be pasted. With a touch action on the function key 1422, when receiving the mentioned signal, a removal procedure is started to erase the related characters from the text editor.

Figure 15:
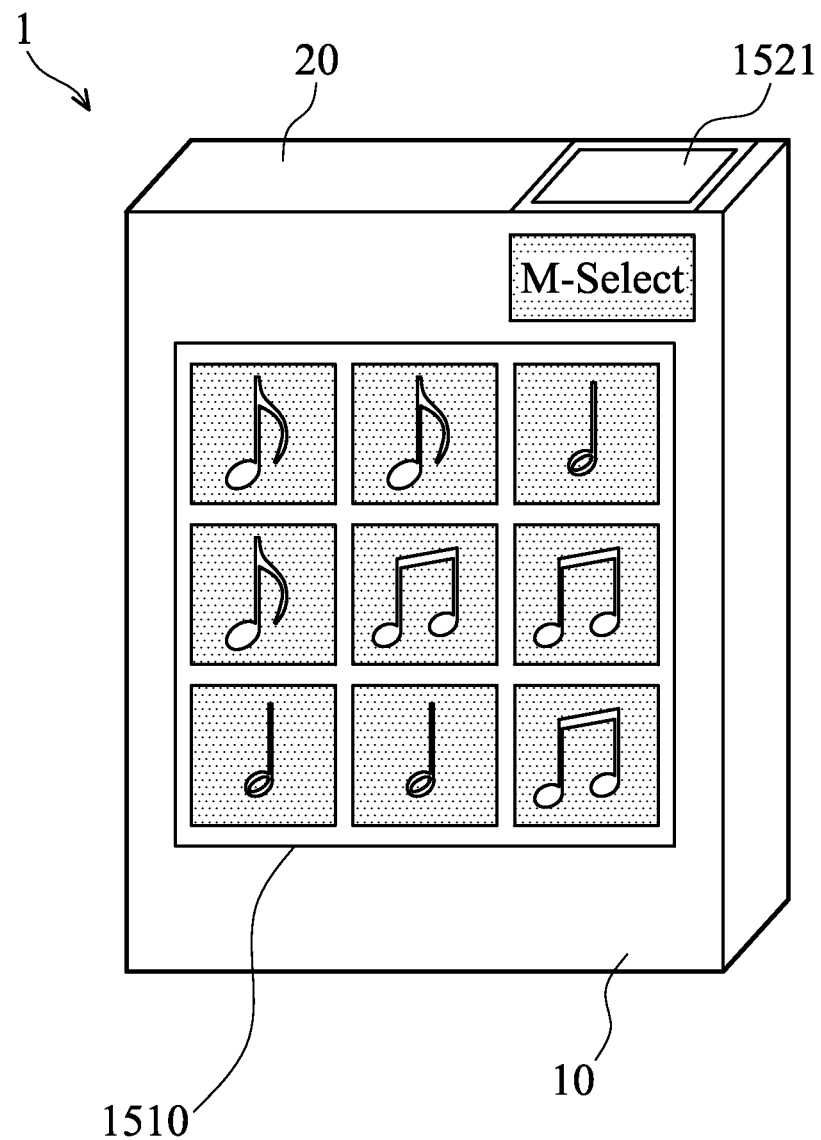
FIG. 15 is a block diagram illustrating an MMI with a soft function key for a listing application in accordance with an embodiment of the invention.

FIG. 15 is a schematic diagram illustrating an MMI with a soft function key for a listing application in accordance with an embodiment of the invention. The listing application is used to browse any stored data or program items in a specific group or directory inside the device 1. The main screen 1510 is displayed on the front panel 10. A matrix of icons is shown in the main screen 1510 each associated with one stored data or program item. In some embodiments, the main screen 1510 shows a menu containing multiple menu items each related to one stored data or program item and displayed as an item icon. The top side panel 20 of the device 1 provides a multi-select function key 1521. A respective prompt icon is displayed on the front panel 10 to indicate the location of the multi-select function key 1521 to the user. With no touch action on the multi-select function keys 1521, when receiving a signal indicating a touch action on one item icon, a single-select procedure is started to highlight the item icon, or remove the highlight from a previously selected item icon. With a touch action on the multi-select function key 1521, when receiving the mentioned signal, a multi-select procedure is started to not only highlight the current selected one but maintain the highlight over the previously selected ones as well. It is to be understood that the data or program items corresponding to the highlighted ones may be subsequently moved to another storage space or deleted by a user.

Figure 16:
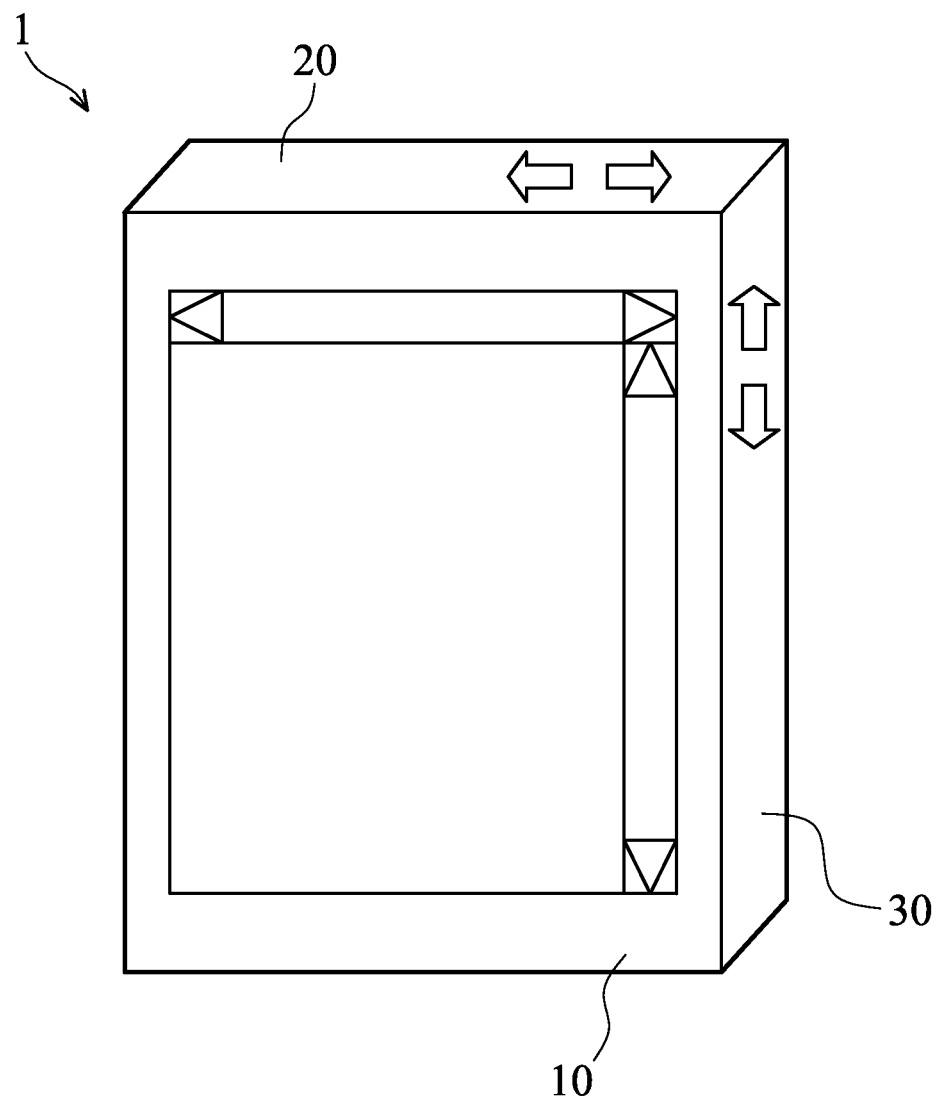
FIG. 16 is a block diagram illustrating an MMI with horizontal and vertical scroll controls in accordance with an embodiment of the invention.

Referring to FIG. 16, the horizontal and vertical scroll controls provided by the side panels 20 and 30 of the device 1 can be used in any suitable application which requires the scroll controls to extend the view range of the a main screen on the front panel. For example, a browser, a text editor, an image editor, etc. By sliding up any object on the side panel 20 or side panel 30, the view of the displayed image is scrolled by an extent depending on the length of the slide.

Figure 17:
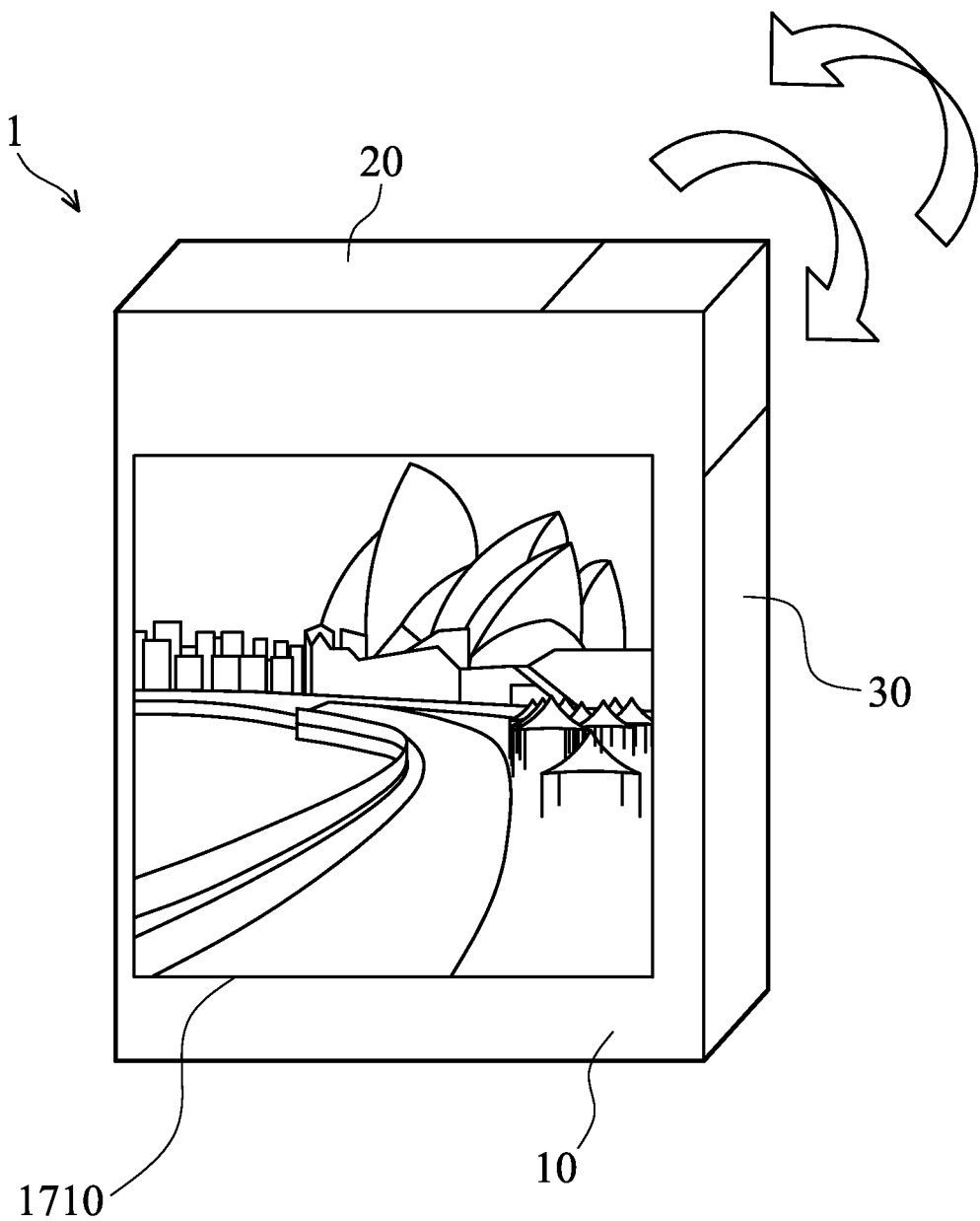
FIG. 17 is a block diagram illustrating an MMI for an image viewer application in accordance with an embodiment of the invention.

FIG. 17 is a schematic diagram illustrating an MMI for an image viewer application in accordance with an embodiment of the invention. A main screen 1710 is displayed on the front panel 10. The side panels 20 and 30 of the device 1 together provide an alternative rotation control over the displayed image on the main screen 1710. Sensors placed on or under the side panels are adjacently arranged on two side panels to form a control corner, where each two sensors may be placed by a predetermined distance. Although placing one sensor on or under each side panel is sufficient, it will be feasible to place two or more sensors on or under each to improve reliability. The sliding of any object from the surface of the side panel 20 to the surface of the side panel 30 causes the displayed image to rotate clockwise. On the other hand, the sliding of any object from the surface of the side panel 30 to the surface of the side panel 20 causes the displayed image to rotate counterclockwise. The rotation may be in a predetermined angle (90 degree in typical) every time the slide occurs, or alternatively, in an angle which is dependent on the length of the slide, e.g., the longer the length, the larger the angle of the rotation is. When executed by a processor or MCU, for example, the image viewer application may determine one of four orders, such as from the upper-left position to the lower-right position, from the upper-right to the lower-left, from the lower-right to the upper-left, and from the lower-left to the upper-right in response to the detected clockwise or counterclockwise slide action on the control corner, and then, read pixel data from a frame buffer of the device 1 in the determined order, and output to the front panel 10 to display.

Figure 18:
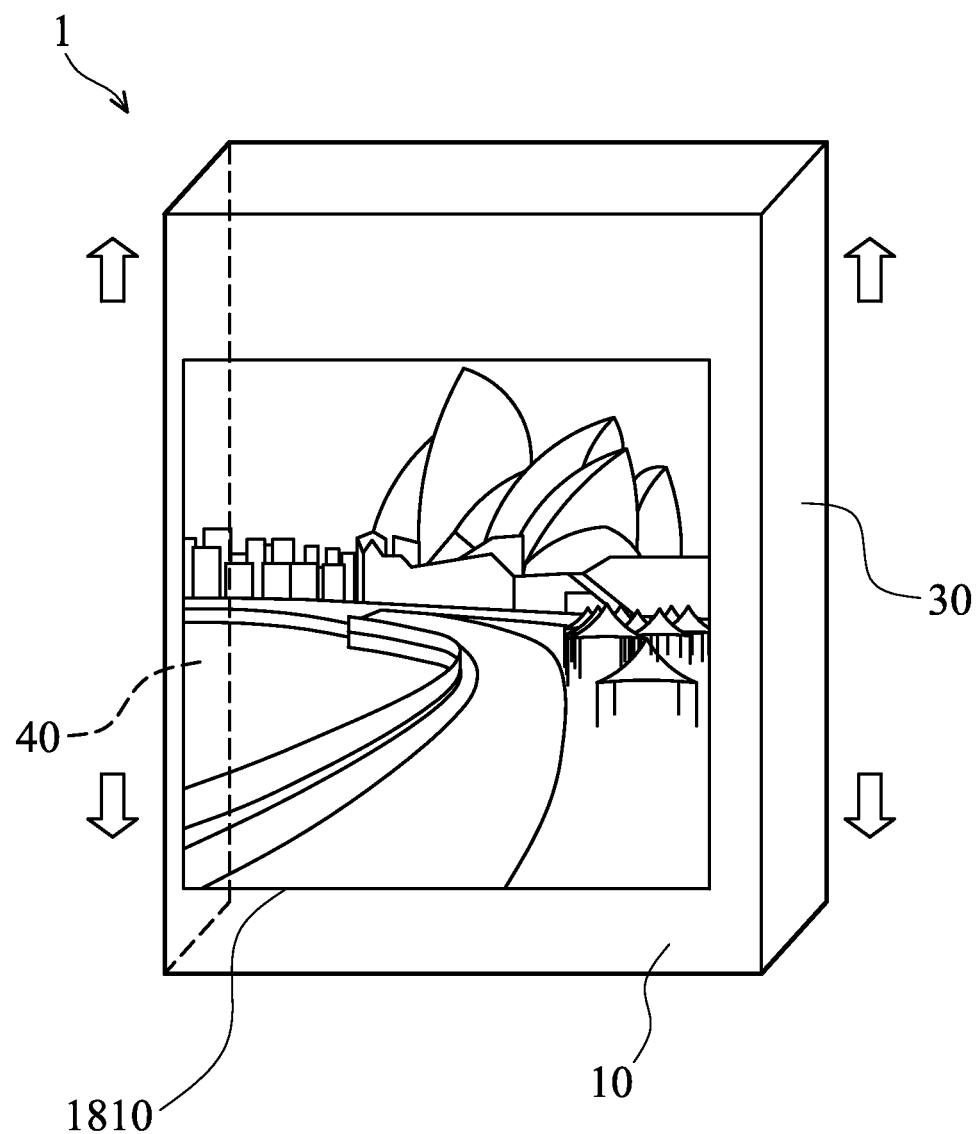
FIG. 18 is a block diagram illustrating an MMI for an image viewer application in accordance with another embodiment of the invention.

FIG. 18 is a schematic diagram illustrating an MMI for an image viewer application in accordance with another embodiment of the invention. The main screen 1610 is displayed on the front panel 10. The side panels 30 and 40 of the device 1 both provide an alternative zooming control over the displayed image on the main screen 1610. By sliding up any object on the side panel 30 or side panel 40, the view of the displayed image will be zoomed in to an extent depending on the length of the slide. On the other hand, by sliding down any object on the side panel 30 or side panel 40, the view of the displayed image will be zoomed out to an extent depending on the length of the slide. When executed by a processor or MCU, for example, the image viewer application may determine an extent of an enlargement or shrink in terms of the slide length detected via the side sensors, and accordingly zoom in or out the displayed image.

Figure 19:
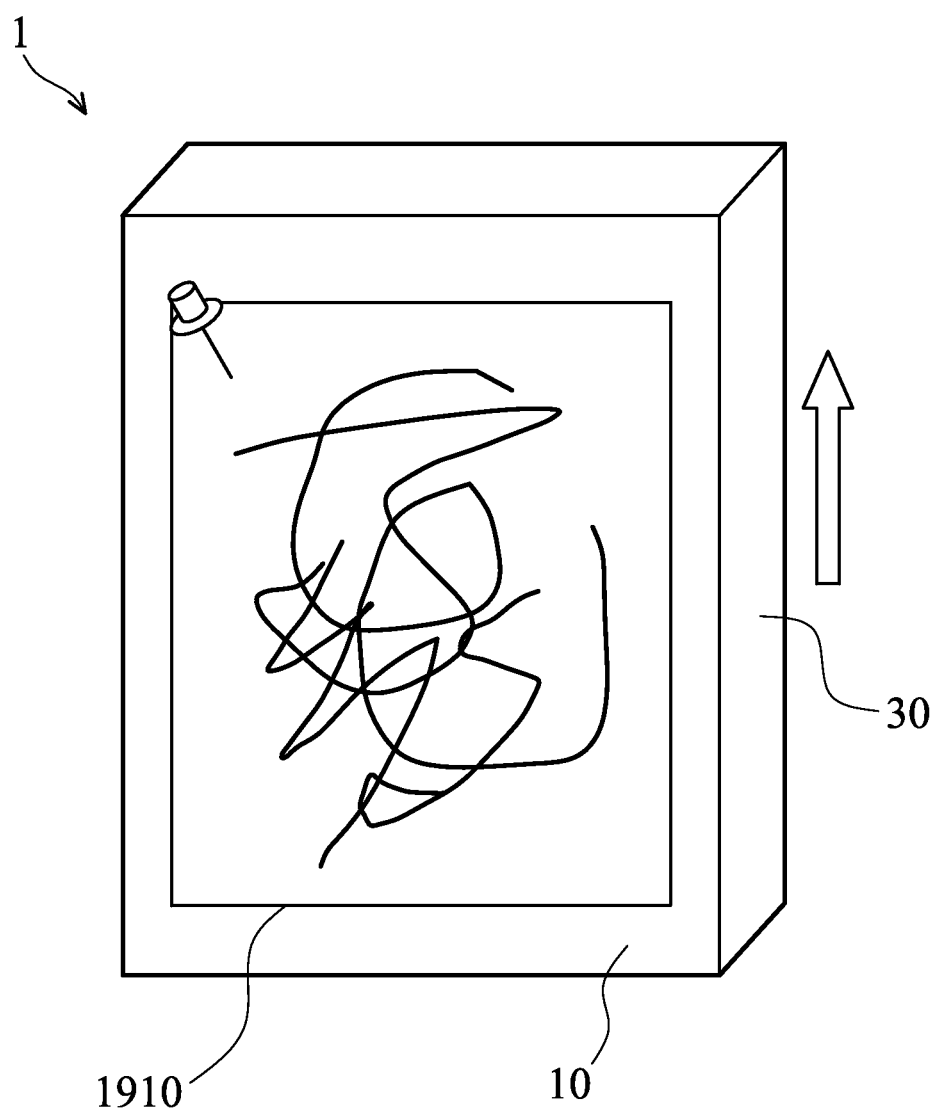
FIG. 19 is a block diagram illustrating an MMI for a virtual scratch board application in accordance with an embodiment of the invention.

FIG. 19 is a schematic diagram illustrating an MMI for a virtual scratch board application in accordance with an embodiment of the invention. The main screen 1910 is displayed on the front panel 10. The user may write down any words or draw any figures by sliding any objects on the main screen 1910. The side panel 30 provides a wiping control over the written words or drawn figures on the main screen 1910. If a user wishes to erase the written words or drawn figures from the main screen 1910, he/she may slide any object on the side panel 30 up. In other embodiments, the wiping control may be provided by the other side panel of the device 1, or the direction of the slide may be configured to be downwards on a specific side panel. When executed by a processor or MCU, for example, the virtual scratch board application may clear all or a portion of data from a frame buffer of the device 1 when detecting an upward or downward slide action on the side panel 30.

Figure 20:
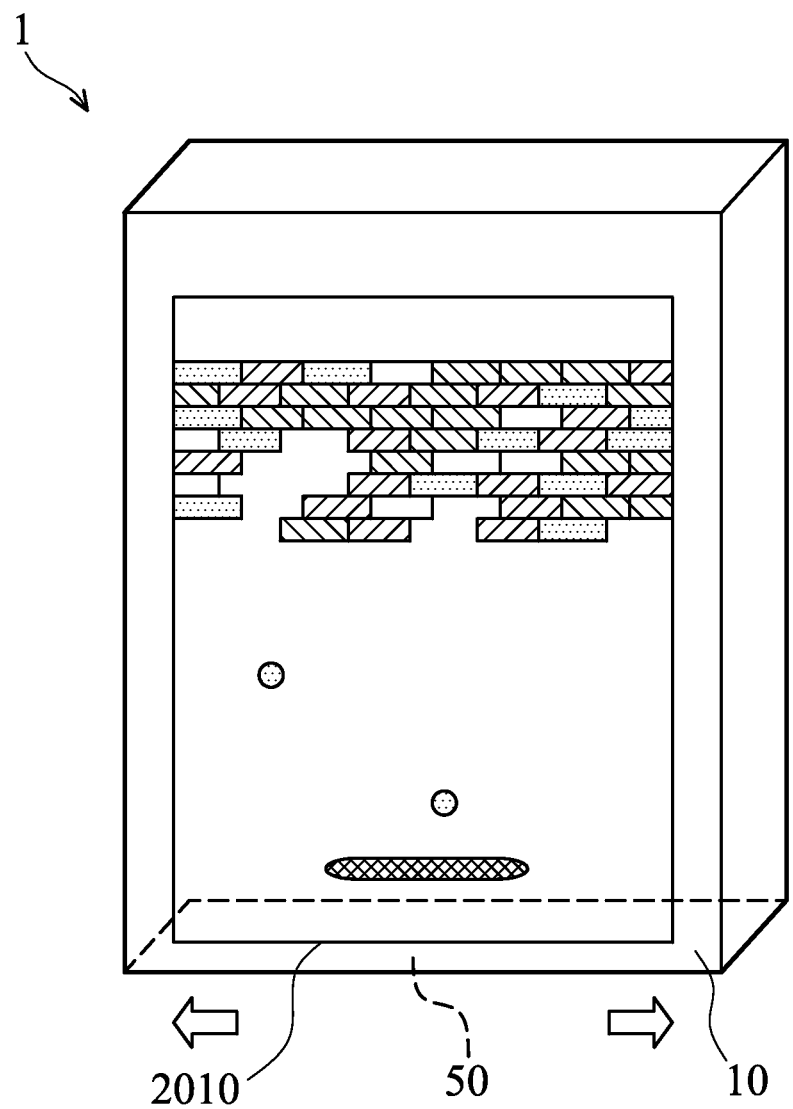
FIG. 20 is a block diagram illustrating an MMI for a wall-breaker game in accordance with an embodiment of the invention.
Figure 21:
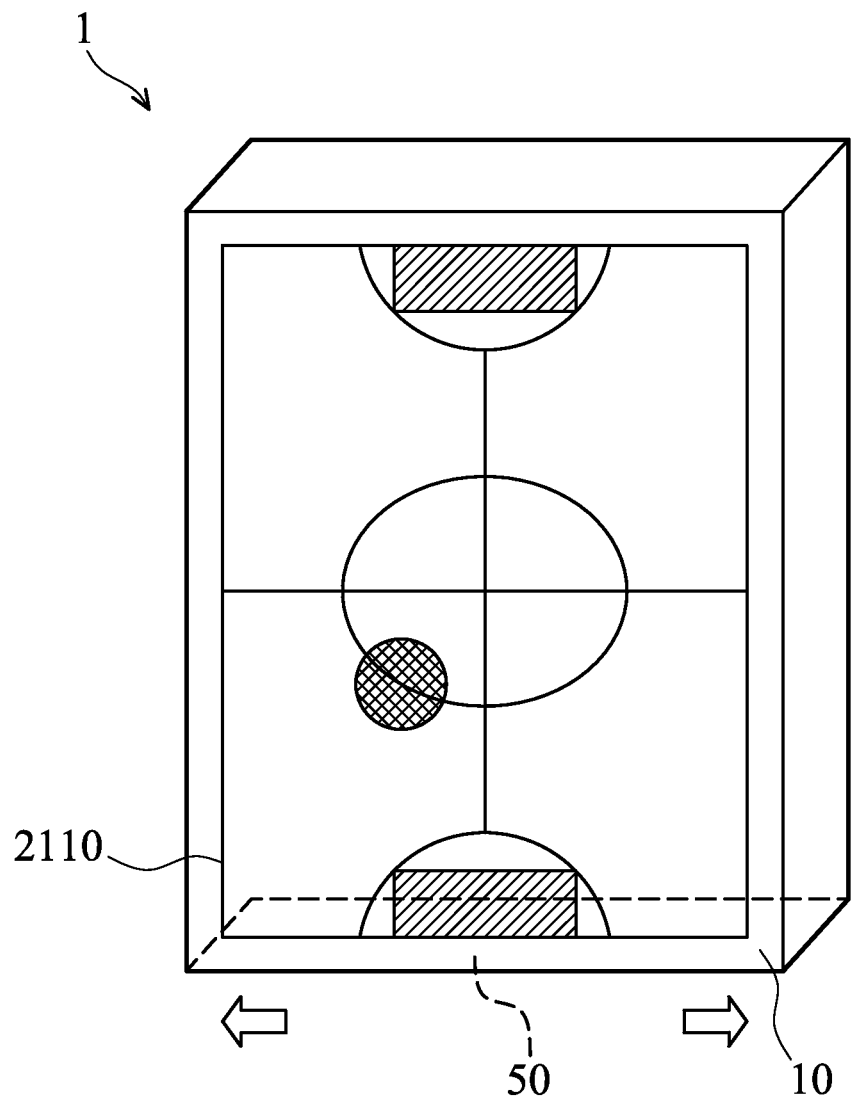
FIG. 21 is a block diagram illustrating an MMI for a bouncing-ball game in accordance with an embodiment of the invention.

Referring to FIG. 20, the main screen 2010 of a wall-breaker game is displayed on the front panel 10. The user may move the bat on the main screen 2010 by sliding right/left any object on the bottom side panel 50. Similarly, FIG. 21 is a block diagram illustrating a GUI for a bouncing-ball game in accordance with an embodiment of the invention. The main screen 2110 of the bouncing-ball game is displayed on the front panel 10. The user may move the bat at the goal-mouth by sliding right/left any object on the bottom side panel 50. When executed by a processor or MCU, for example, the wall-breaker game or bouncing-ball game may determine a movement distance in terms of the slide length detected via the side sensors, in which a longer distance is decided for a longer slide length, and accordingly compute the position of the bat.

Figure 22:
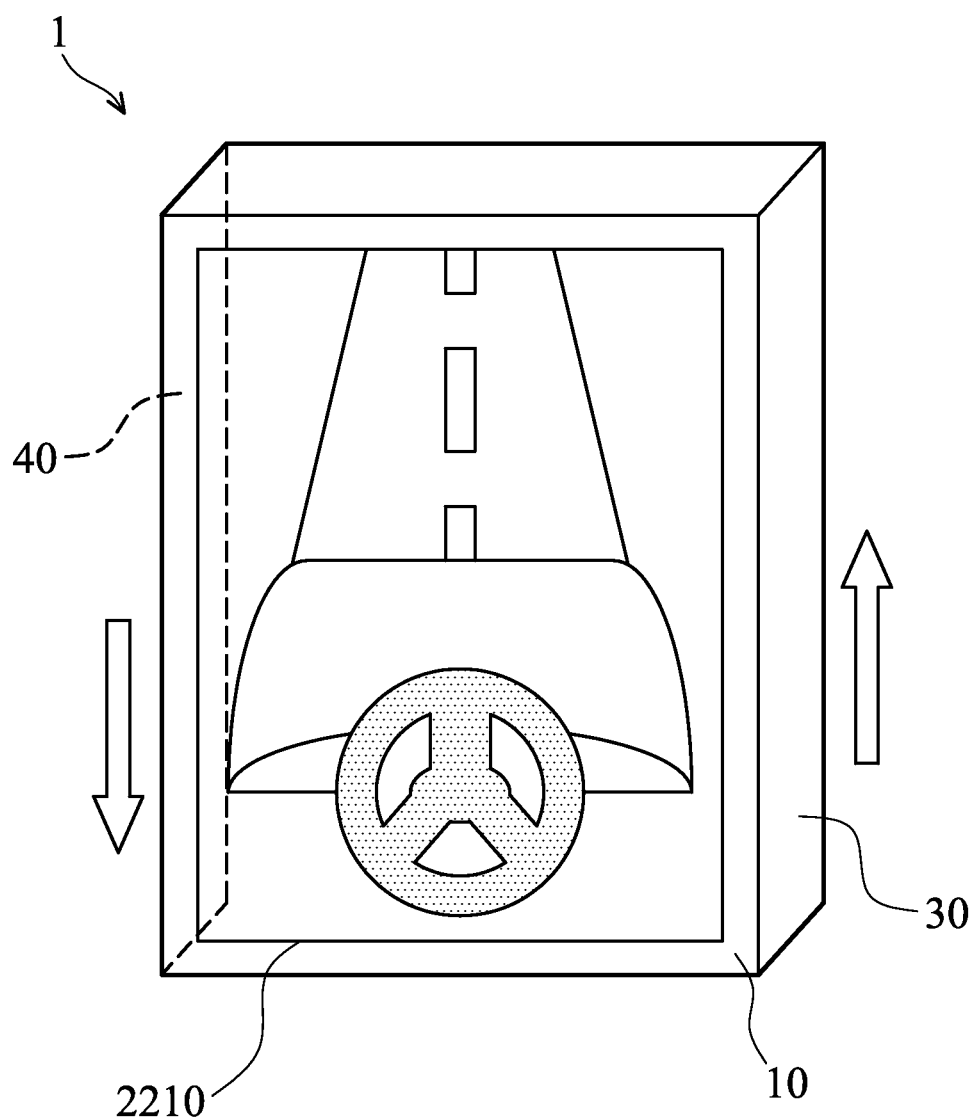
FIG. 22 is a block diagram illustrating an MMI for a car-driving game in accordance with an embodiment of the invention.

FIG. 22 is a schematic diagram illustrating an MMI for a car-driving game in accordance with an embodiment of the invention. The main screen 2210 of the car-driving game is displayed on the front panel 10. The user may control the steering wheel by sliding up/down any object on the side panels 30 and 40. For example, sliding up any object on the side panel 30 turns the steering wheel counterclockwise, and sliding down any object on the side panel 40 turns the steering wheel clockwise.

Figure 23:
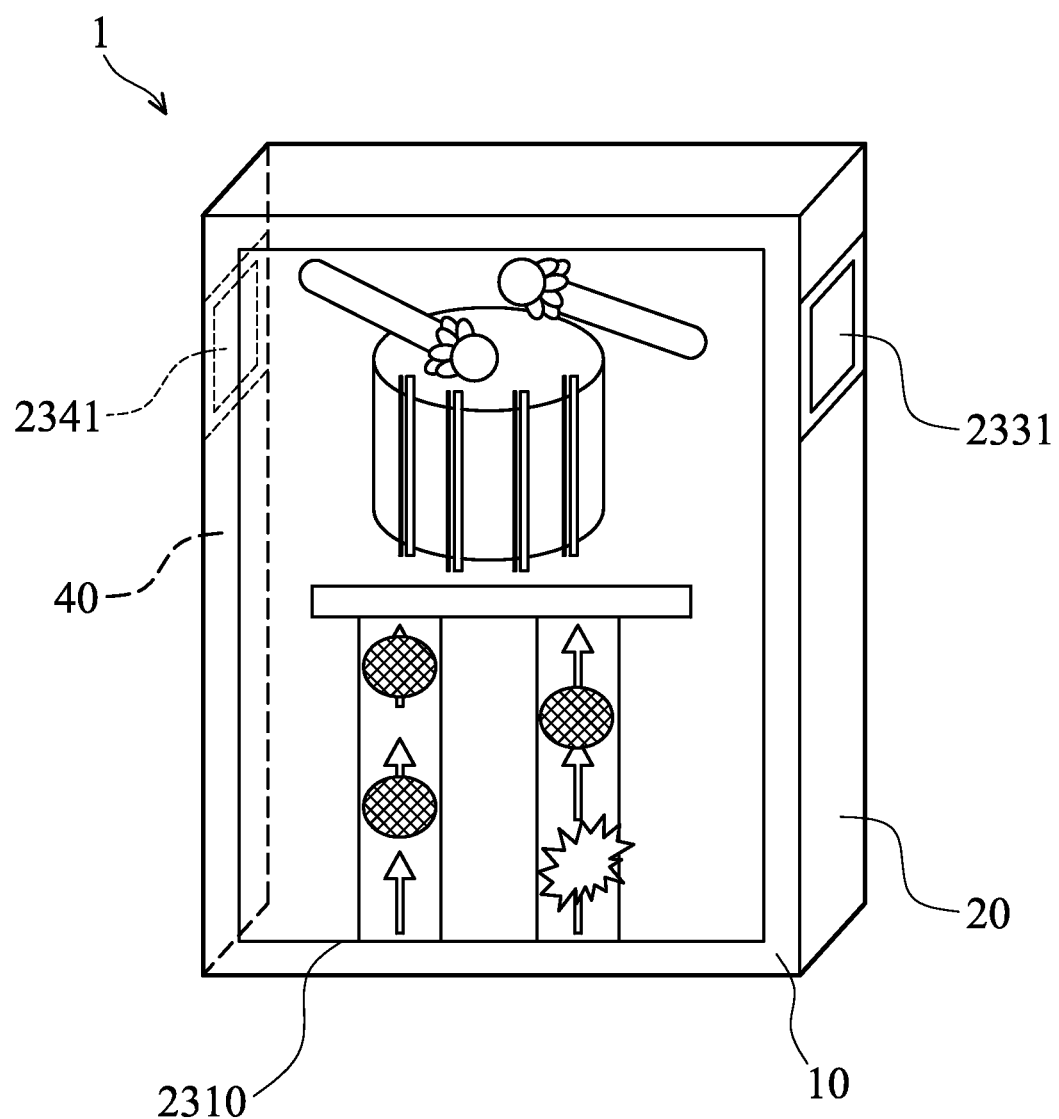
FIG. 23 is a block diagram illustrating an MMI for a drumming game in accordance with an embodiment of the invention.

FIG. 23 is a schematic diagram illustrating an MMI for a drumming game in accordance with an embodiment of the invention. The main screen 2110 of the drumming game is displayed on the front panel 10. Intuitively, a right drumstick displayed on the main screen 2310 is controlled by sensing results on an area 2331 of the side panel 30 since the area 2331 is right next to the right drumstick. The left drumstick displayed on the main screen 2310 is controlled by sensing results on an area 2341 of the side panel 40 next to the left drumstick. When the area on the side panels 30 or 40 is touched, the drumming game drives the corresponding drumstick to hit the drum.

In some of the above-mentioned embodiments, the prompt icons are displayed in the front panel 10 to indicate the locations of the soft keys to the user. While in other embodiments, the prompt icons may be omitted to leave more space on the front panel 10 to display a main screen of an application.

In the invention as described above, since most controls are located to the side panels, viewing of the display screen is not hindered by objects thereon (e.g. finger, stylus etc.). Also, only one hand of a user may be used for operation, making operation more convenient for users. Moreover, the touch panels employed on the sides of the device are efficiently utilized and provide various controls, such as, soft keys, directional slides, and soft function keys, for different applications, including volume adjustment and play controls (play, pause, forward, backward) of the media player application, zoom in/out and rotate control of the image view application, scroll control and map-viewing of the navigation application, brightness adjustment of the light module, channel control of the digital TV application, page-flipping of the text view application, copy, delete, and multi-select of the listing application, copy, delete, and scroll control of the text editor application, erase control of the writing board application, and gaming control of various game applications.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A touch sensitive apparatus for providing side touch panel as part of man-machine interface (MMI), comprising:
   a front panel disposed on a front surface for displaying information;
   at least two side sensors disposed on or under one of plurality of side surfaces in series for sensing touches thereon;
   a sensor controller coupling the side sensors, and generating signals in response to touches on the side sensors at different times; and
   a processing unit coupling the sensor controller and the front panel, determining a slide action when the received signals indicate that the touches start with one end of the side sensors and end with the other end of the side sensors, and directing the front panel to update the displayed information in terms of the determined slide action.

2. The touch sensitive apparatus of claim 1, wherein any two of the successive touches of the slide action is limited into a predetermined time period.

3. The touch sensitive apparatus of claim 2, wherein the slide action is determined when detecting starts or terminations between any two of the successive touches are limited into the time period.

4. The touch sensitive apparatus of claim 1, wherein the side sensors are disposed on or under a left or right side surface.

5. The touch sensitive apparatus of claim 1, wherein the side sensors are disposed on or under a top side surface.

6. The touch sensitive apparatus of claim 1, wherein the processing unit amplifies a gain of audio signals to a speaker thereof or a earphone connecting thereto when the slide action is a upward slide action, and suppresses the gain of audio signals to the speaker thereof or the earphone connecting thereto when the slide action is a downward slide action.

7. The touch sensitive apparatus of claim 1, further comprising a TV tuner, wherein the processing unit directs the TV tuner to tune in a specific frequency for receiving TV signals when the slide action is a leftward or rightward slide action.

8. The touch sensitive apparatus of claim 1, further comprising a storage device storing a plurality of images, wherein the processing unit reads the next or prior image from the storage device and directs the front panel to display the read image when the slide action is a leftward or rightward slide action.

9. The touch sensitive apparatus of claim 1, further comprising a light module for generating lights, wherein the processing unit directs the light module to scale up the generated lights when the slide action is a upward slide action and to scale down the generated lights when the slide action is a downward slide action.

10. The touch sensitive apparatus of claim 1, wherein the front panel displays a list of plurality of data items, and the processing unit directs the front panel to move a highlight to another data item when detecting the slide action.

11. The touch sensitive apparatus of claim 1, wherein the front panel displays an image, and the processing unit directs the front panel to horizontally or vertically scroll the displayed image when detecting the slide action, and the displayed image is scrolled by an extent depending on a length of the slide action.

12. The touch sensitive apparatus of claim 1, wherein the front panel displays a drawing, and the processing unit directs the front panel to clear the drawing when detecting the slide action.

13. The touch sensitive apparatus of claim 1, wherein the front panel displays a picture for a game, the processing unit controls the game when detecting the slide action.

14. A touch sensitive apparatus for providing side touch panel as part of man-machine interface (MMI), comprising:
   a front panel disposed on a front surface for displaying information;
   a first side sensor disposed on or under a first side surfaces for sensing touches thereon;
   a second side sensor disposed on or under a second side surface for sensing touches thereon, where one edge of the first side surface is contacted with one edge of the second side surface to form a corner;
   a sensor controller coupling the side sensors, and generating signals in response to touches on the first and second side sensors at different times; and
   a processing unit coupling the sensor controller and the front panel, determining a clockwise or counterclockwise slide action when the received signals indicate that the touches are detected by the first and second side sensors in sequence from one of the first side surface and the second side surface to the other one of the first side surface and the second side surface via the corner, and accordingly directing the front panel to update the displayed information.

15. The touch sensitive apparatus of claim 14, wherein the touches on the first and second side sensors is limited into a predetermined time period.

16. The touch sensitive apparatus of claim 14, wherein the processing unit directs the front panel to clockwise rotate a displayed image when determining the clockwise slide action, and directs the front panel to counterclockwise rotate the displayed image when determining the counterclockwise slide action.

17. A touch sensitive apparatus for providing side touch panel as part of man-machine interface (MMI), comprising:
   a front panel disposed on a front surface for displaying information;
   a first side sensor disposed on or under a first side surface for sensing touches thereon;
   a second side sensor disposed on or under a second side surface for sensing touches thereon;
   a sensor controller coupling the side sensors, and generating signals in response to touches on the first and second side sensors; and
   a processing unit coupling the sensor controller and the front panel, directing the front panel to update the displayed information using a first control when the received signals indicate that the touches are detected by the first side sensor, and directing the front panel to update the displayed information using a second control when the received signals indicate that the touches are detected by the second side sensor.

18. The touch sensitive apparatus of claim 17, wherein the first side surface is a top or bottom side surface with at least two first sensors and the second side surface is a left or right side surface with at least two second sensors, the processing unit vertically scrolls a displayed image on the front panel when detecting a upward or downward slide action on the second sensors, as well as, horizontally scrolls the displayed image when detecting a leftward or rightward slide action on the first sensors.

19. The touch sensitive apparatus of claim 17, further comprising a third sensor disposed on or under a third side surface in parallel to the second side surface for sensing touches thereon, wherein the first side surface is a top or bottom side surface with at least two first sensors and the second side surface is a left or right side surface with at least two second sensors, the processing unit switches between a browsing mode and a resizing mode when detecting a touch on the third sensor, directs the front panel to display a focus area on a displayed image when switching to the resizing mode, the processing unit in the browsing mode vertically scrolls the displayed image on the front panel when detecting a upward or downward slide action on the second sensors, as well as, horizontally scrolls the displayed image when detecting a leftward or rightward slide action on the first sensors, and the processing unit in the resizing mode vertically moves the focus area when detecting a upward or downward slide action on the second sensors, as well as, horizontally moves the focus area when detecting a leftward or rightward slide action on the first sensors.

20. The touch sensitive apparatus of claim 17, wherein the first side surface is parallel to the second side surface, the processing unit segments a text message into a plurality of pages, and directs the front panel to display one page of the text message, and the processing unit directs the front panel to display the next page of the text message when detecting a touch on the first side sensor, and directs the front panel to display the prior page of the text message when detecting a touch on the second side sensor.

21. The touch sensitive apparatus of claim 17, wherein the first side surface is parallel to the second side surface, the front panel displays a picture for a game, and the processing unit controls the game when detecting a touch on the first or second side sensor.

22. A touch sensitive apparatus for providing side touch panel as part of man-machine interface (MMI), comprising:
   a front panel disposed on a front surface for displaying information, and comprising a plurality of front sensors for sensing touches thereon;
   a side sensor disposed on or under a side surface for sensing touches thereon;
   a sensor controller coupling the side sensor, and generating signals in response to touches on the side sensor; and
   a processing unit coupling the sensor controller and the front panel, changing a control configuration for responding to a touch on the front sensors when the received signals indicate that the touch is detected by the side sensor.

23. The touch sensitive apparatus of claim 22, wherein the processing unit provides two action handling procedures, triggers one action handling procedure to respond to a touch or slide on the front sensors when the received signals indicate that the touch is detected by the side sensor, otherwise, triggers the other action handling procedure to respond to the touch or slide on the front sensors.

24. The touch sensitive apparatus of claim 23, wherein one action handling procedure is triggered to zoom in or zoom out a displayed image on the front panel, and the other action handling procedure is triggered to scroll up or down the displayed image.

25. The touch sensitive apparatus of claim 23, further comprising a memory, wherein the front panel displays a plurality of characters stored in the memory, one action handling procedure is triggered to highlight the displayed characters and the other action handling procedure is triggered to duplicate the characters.

26. The touch sensitive apparatus of claim 23, wherein the front panel displays a plurality of characters, one action handling procedure is triggered to highlight the displayed characters and the other action handling procedure is triggered to remove the characters from being displayed.

27. The touch sensitive apparatus of claim 23, wherein the front panel displays a plurality of icons, one action handling procedure is triggered to highlight one icon corresponding to the touch thereon and remove a highlight from a previously selected icon, and the other action handling procedure is triggered to not only highlight one icon corresponding to the touch thereon but also maintain a highlight over a previously selected icon.

\* \* \* \* \*